Jan. 1, 1935. R. J. BURROWS ET AL 1,986,134
LIFT TRUCK
Filed May 25, 1931 16 Sheets-Sheet 10
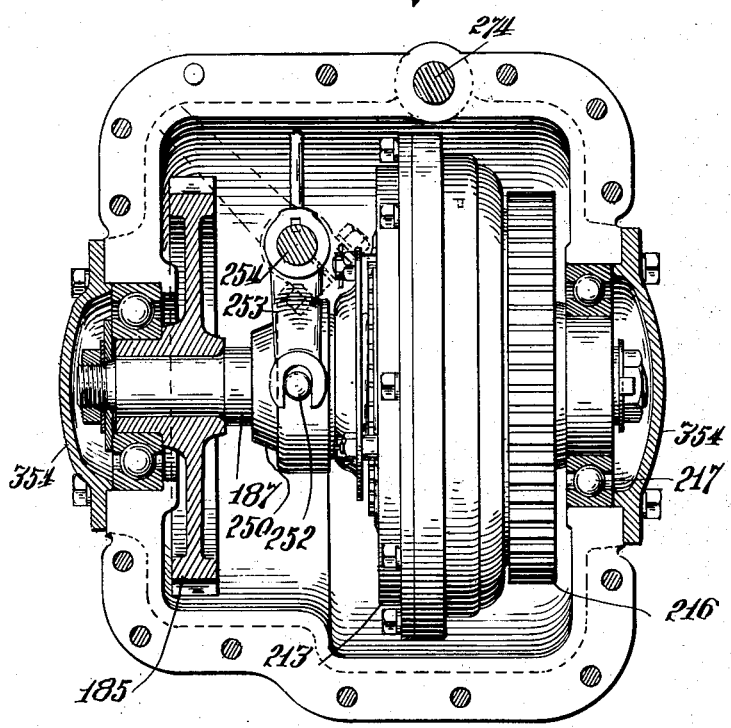
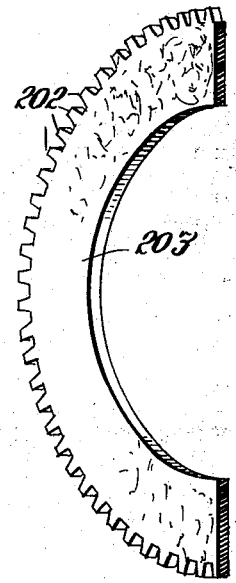
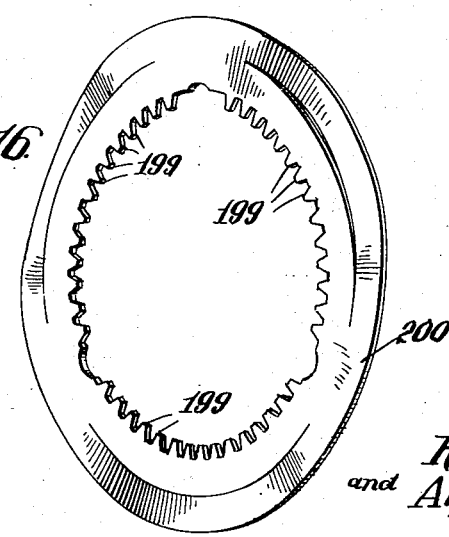
Inventors
Robert J. Burrows
and Alfred O. Williams

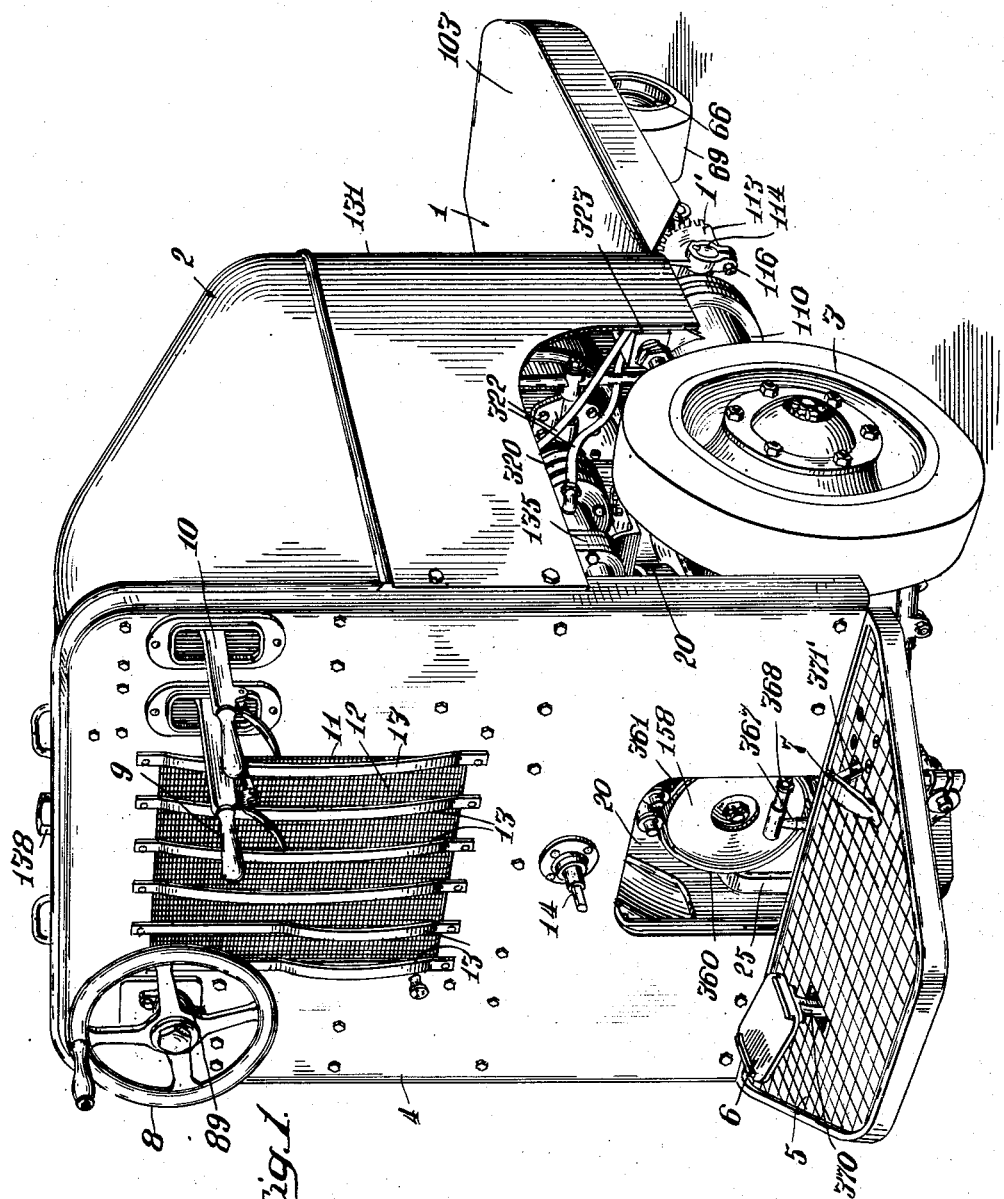

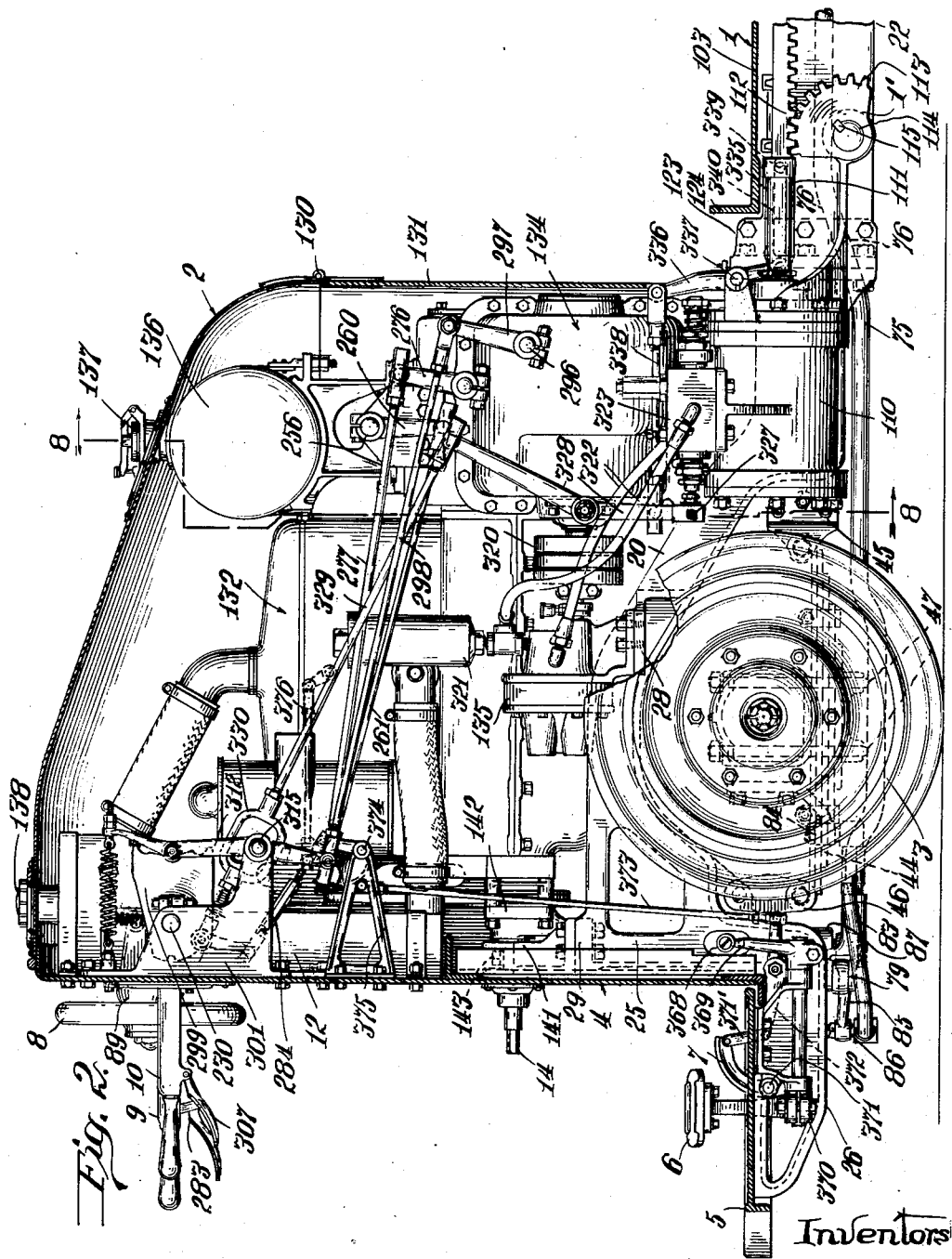

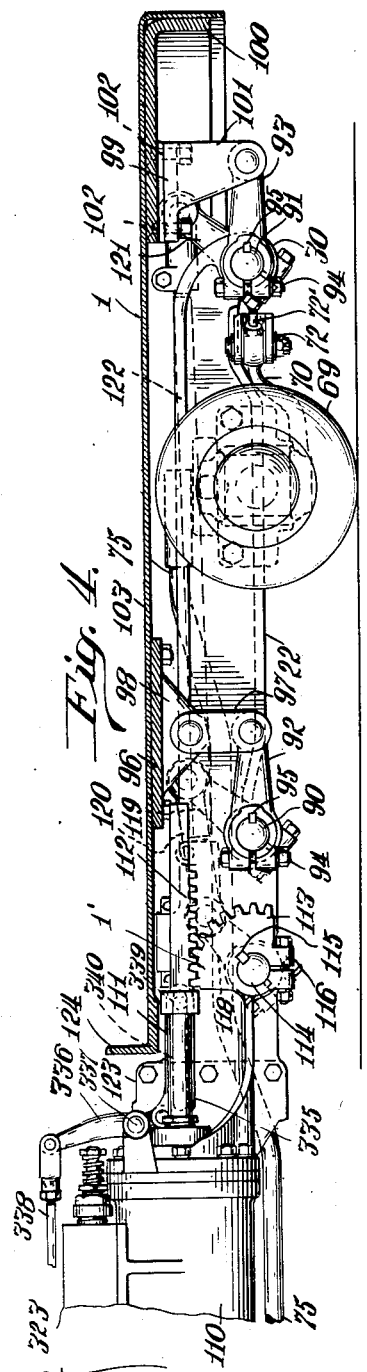
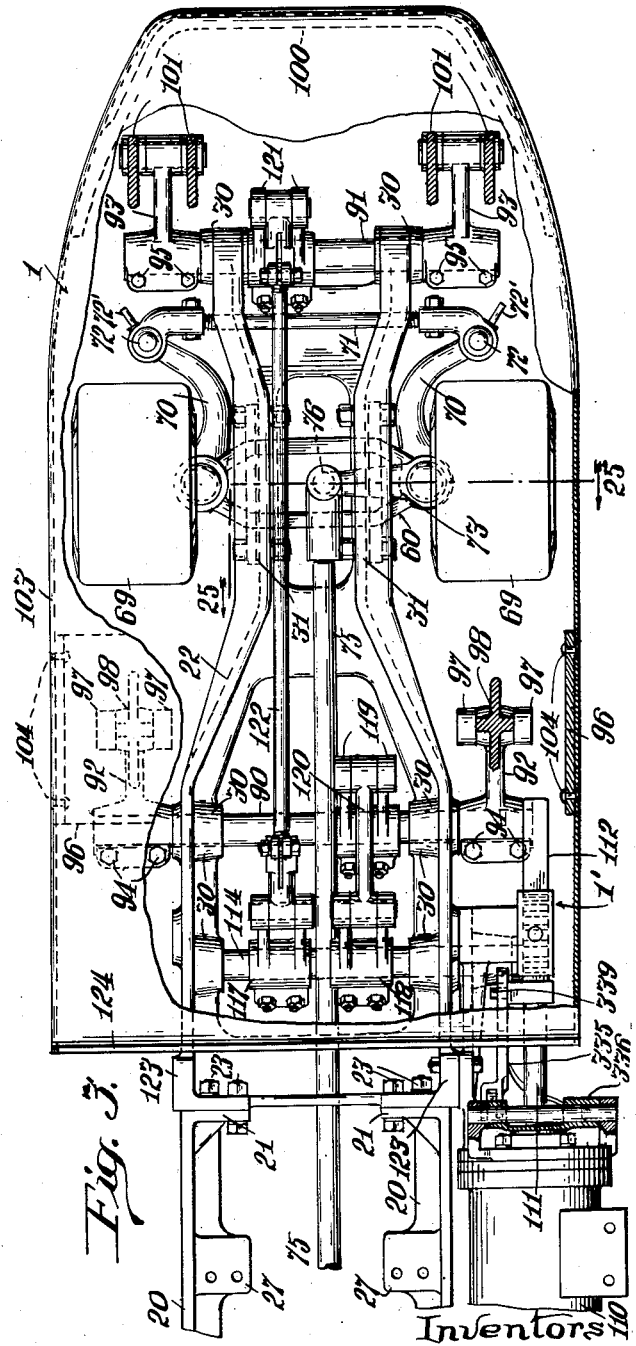

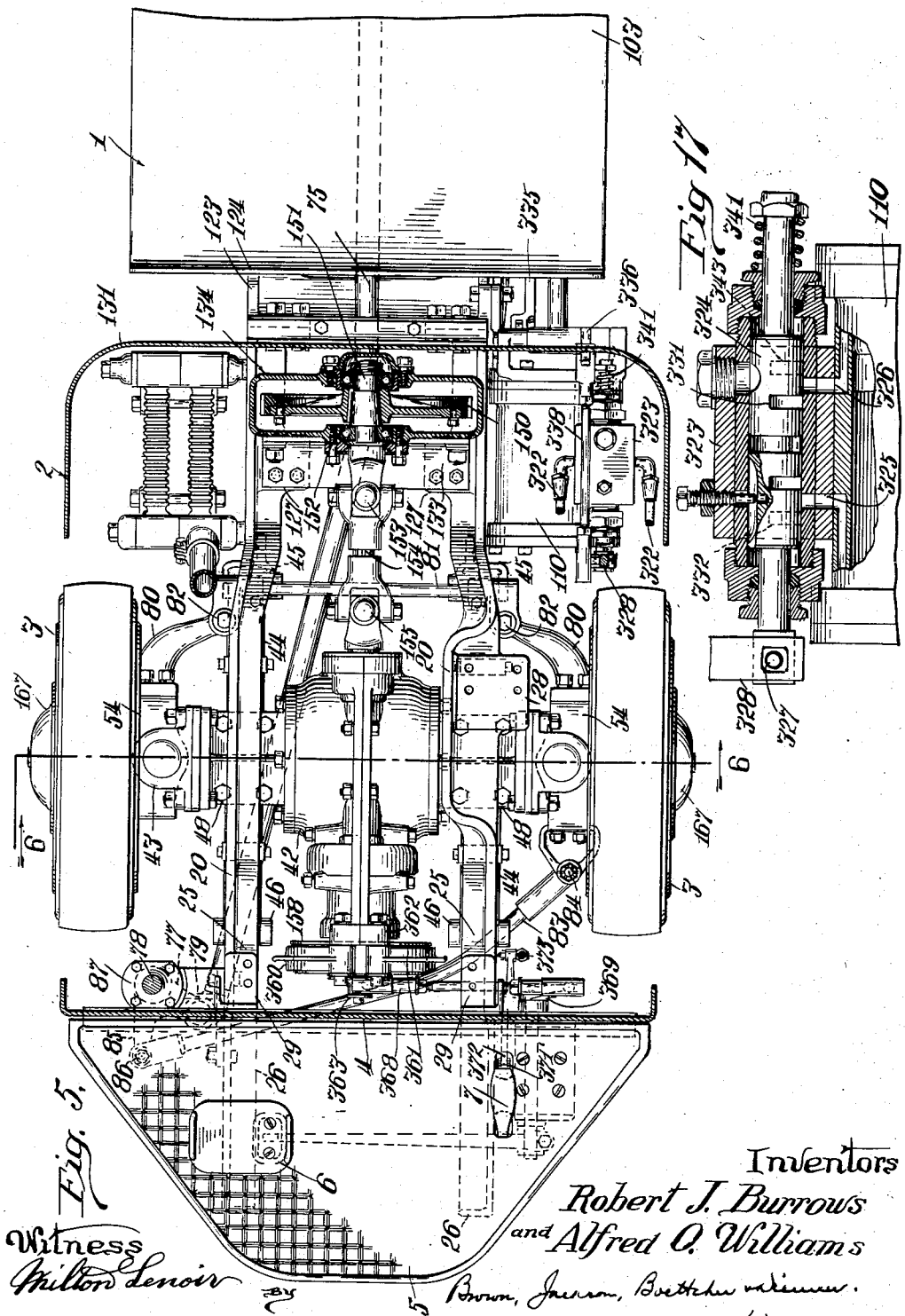

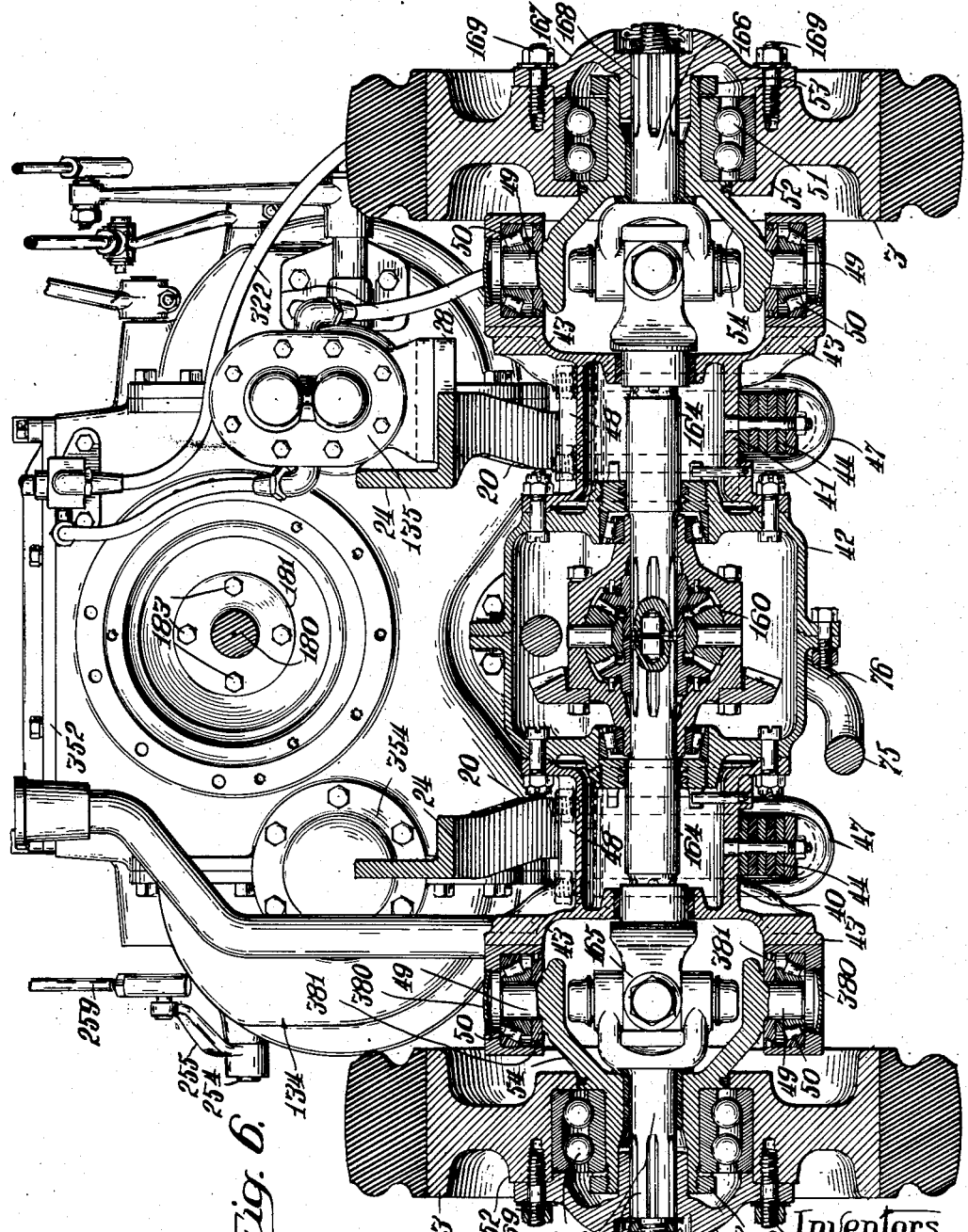

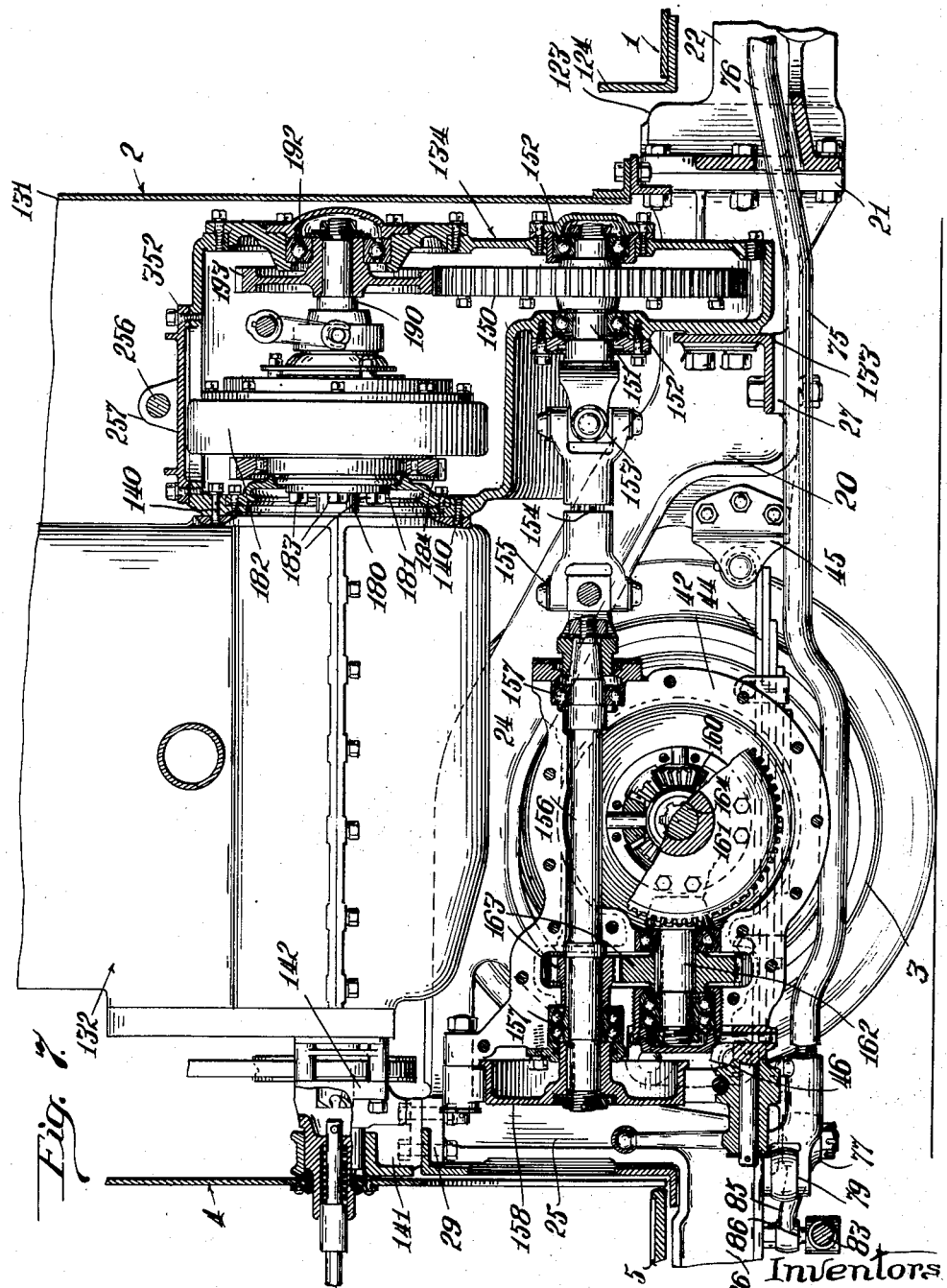

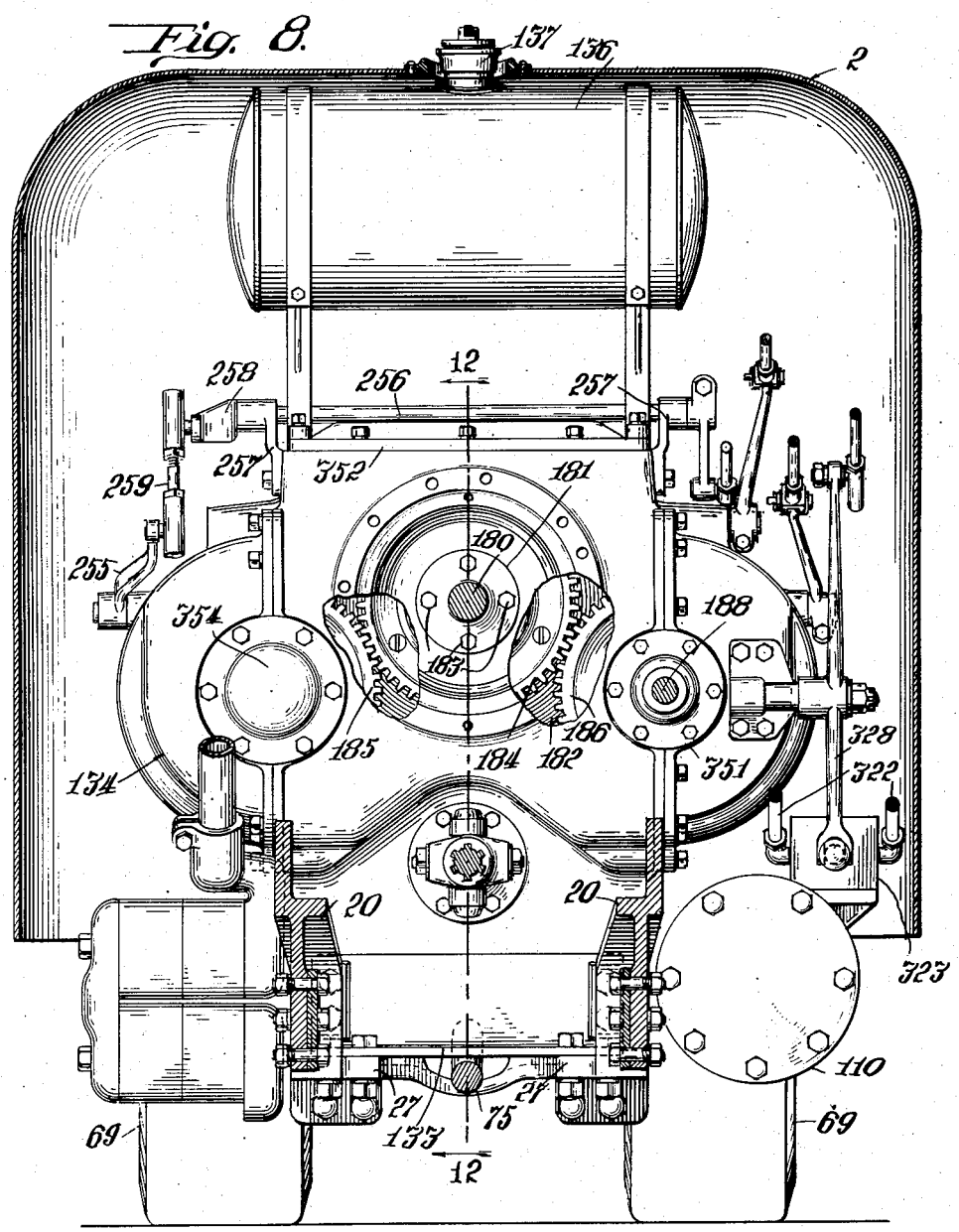

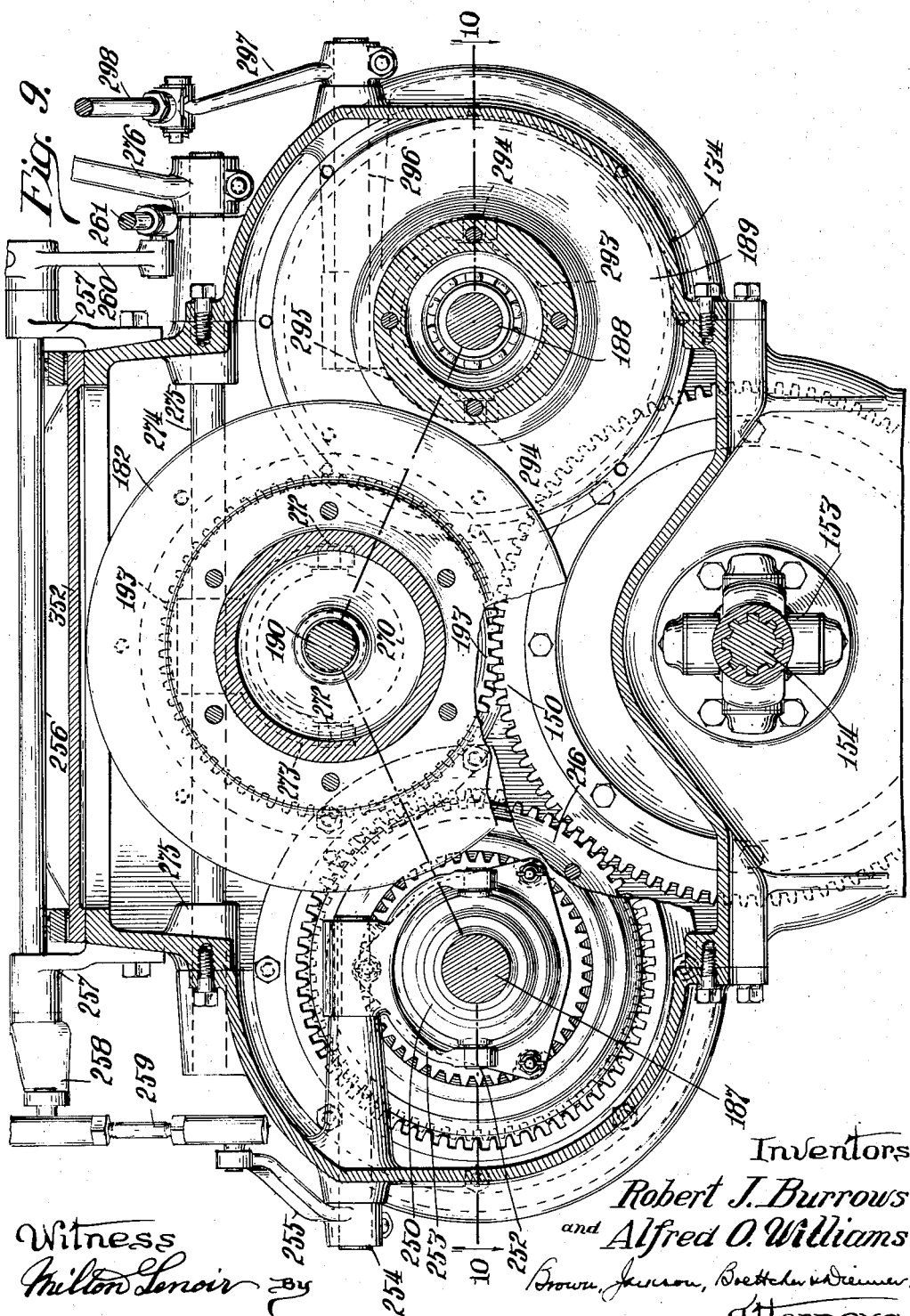

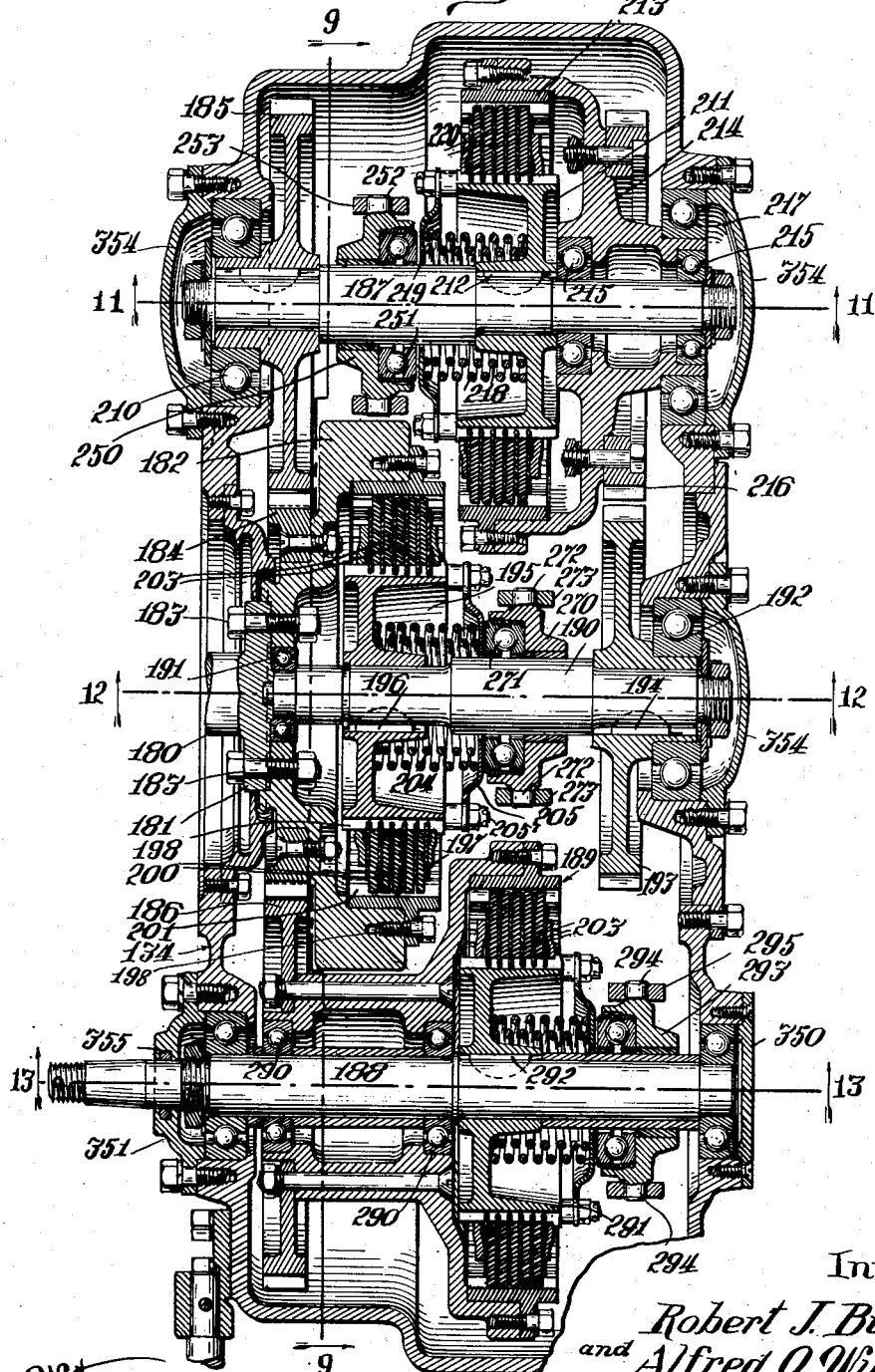

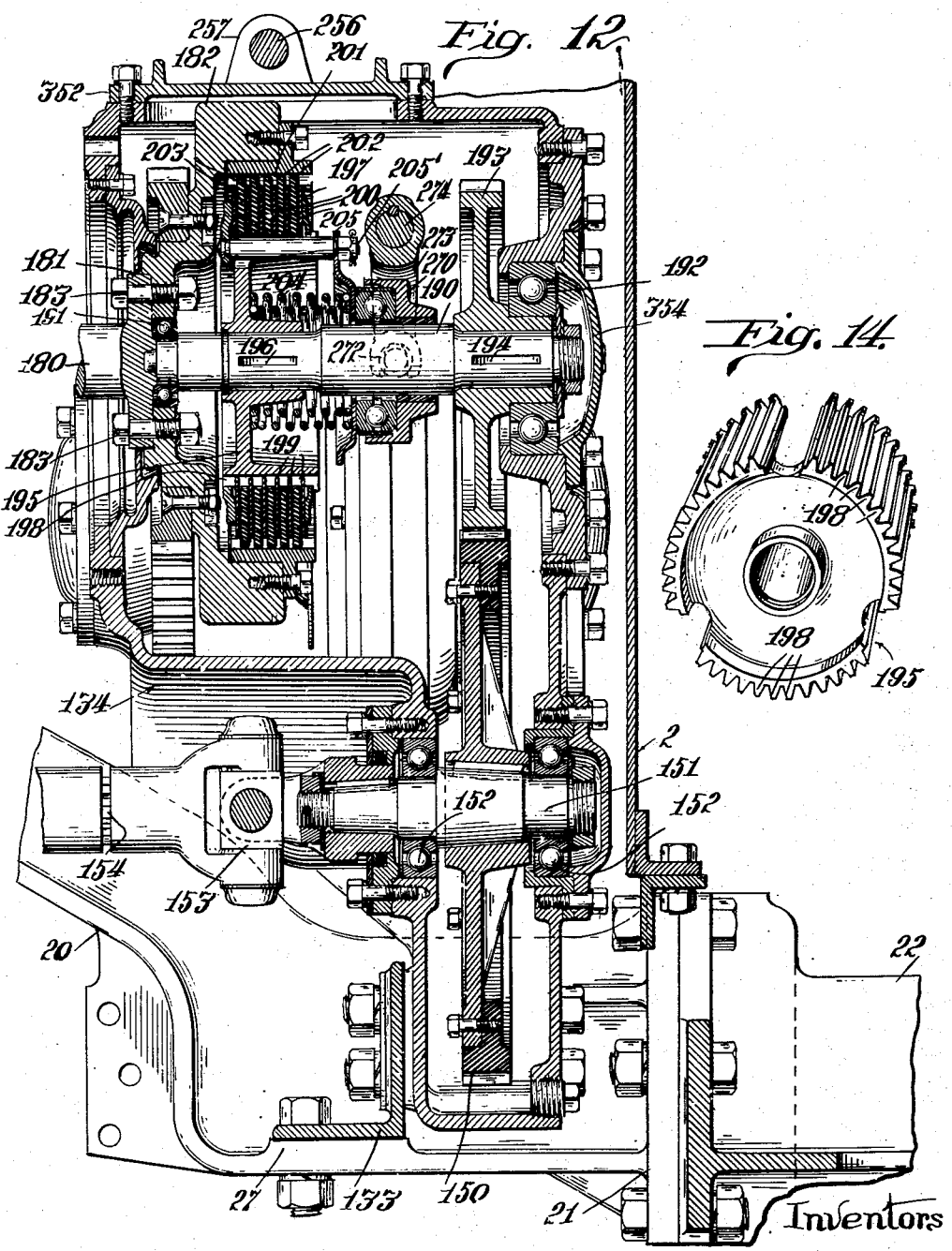

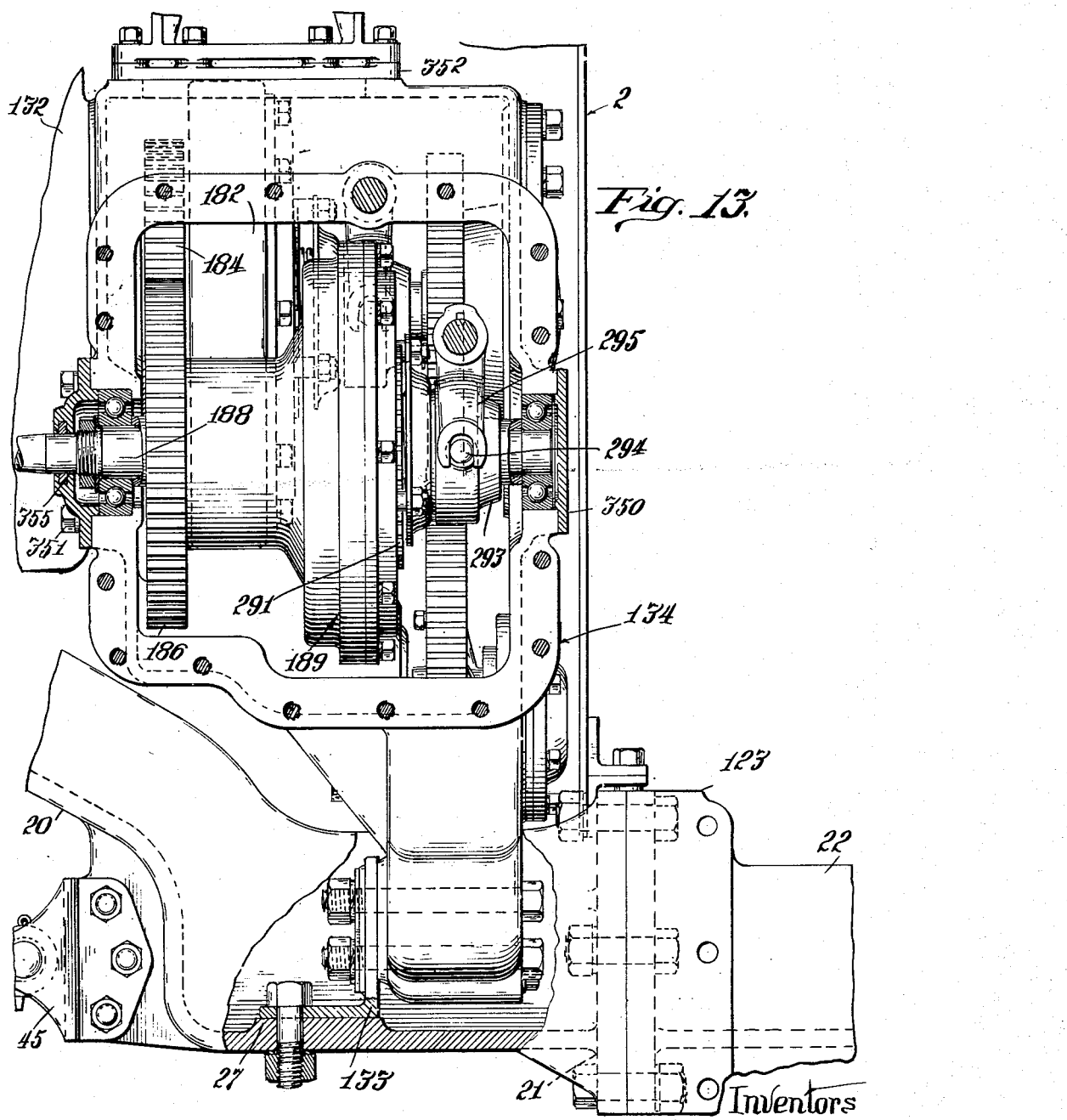

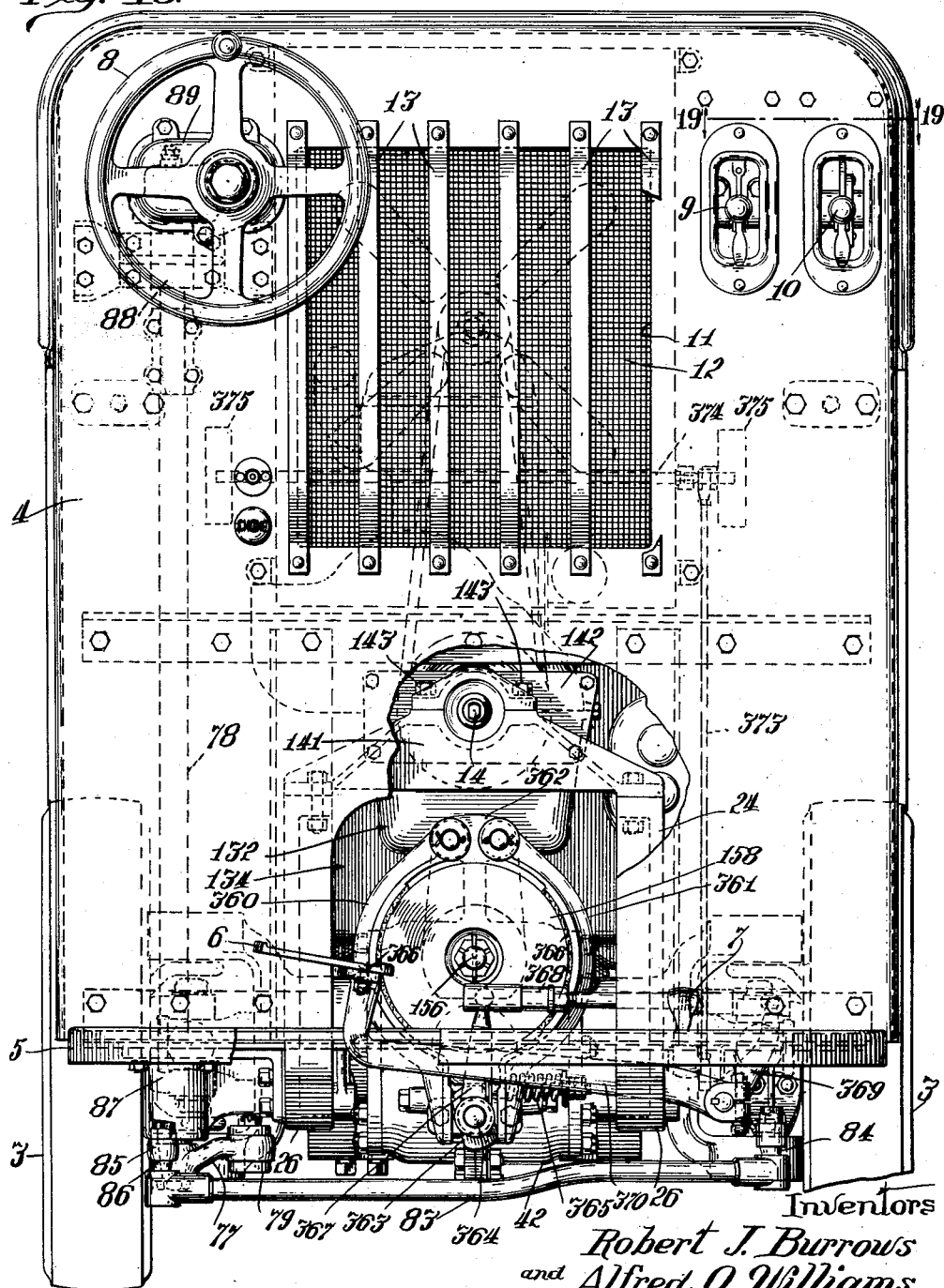

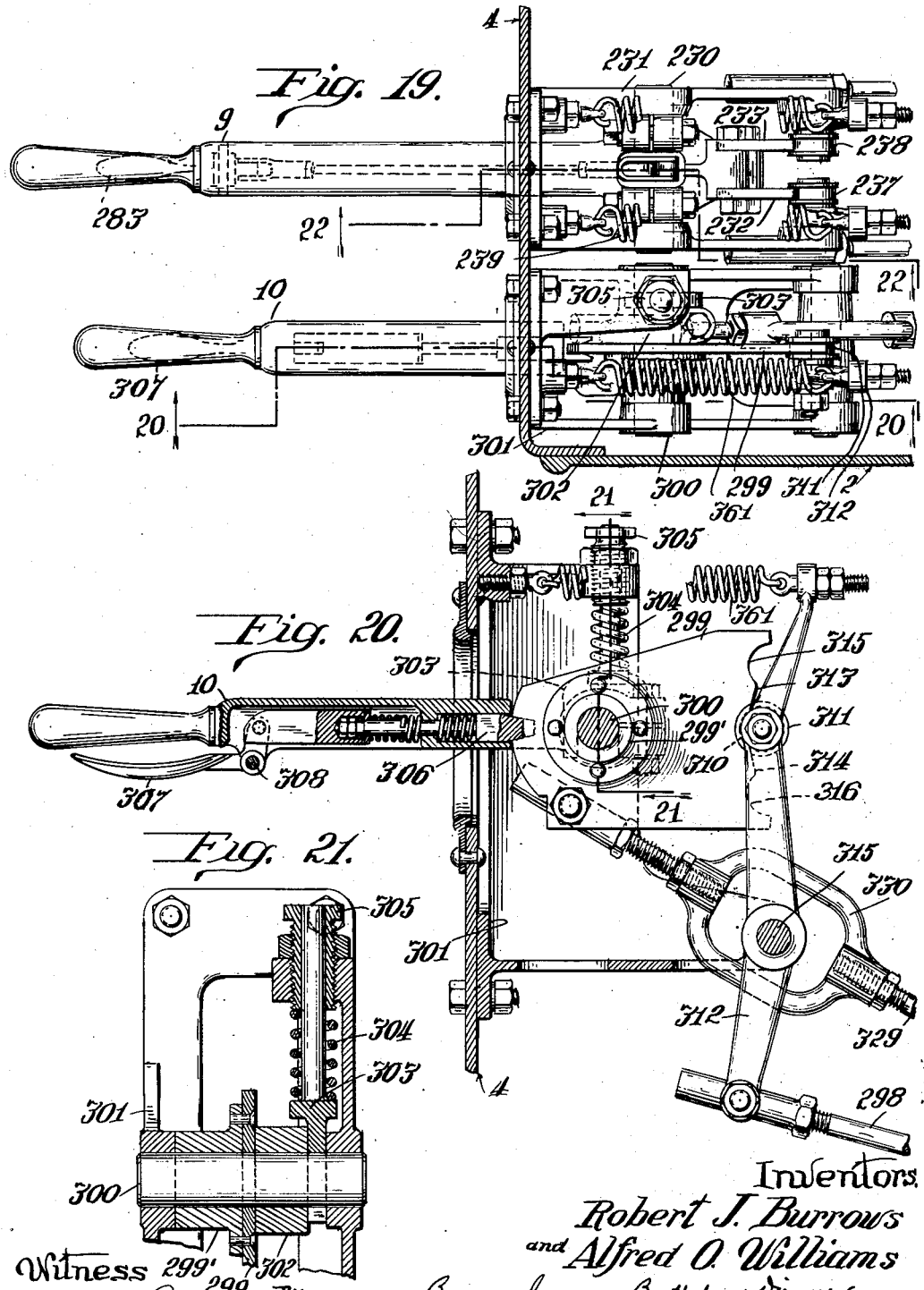

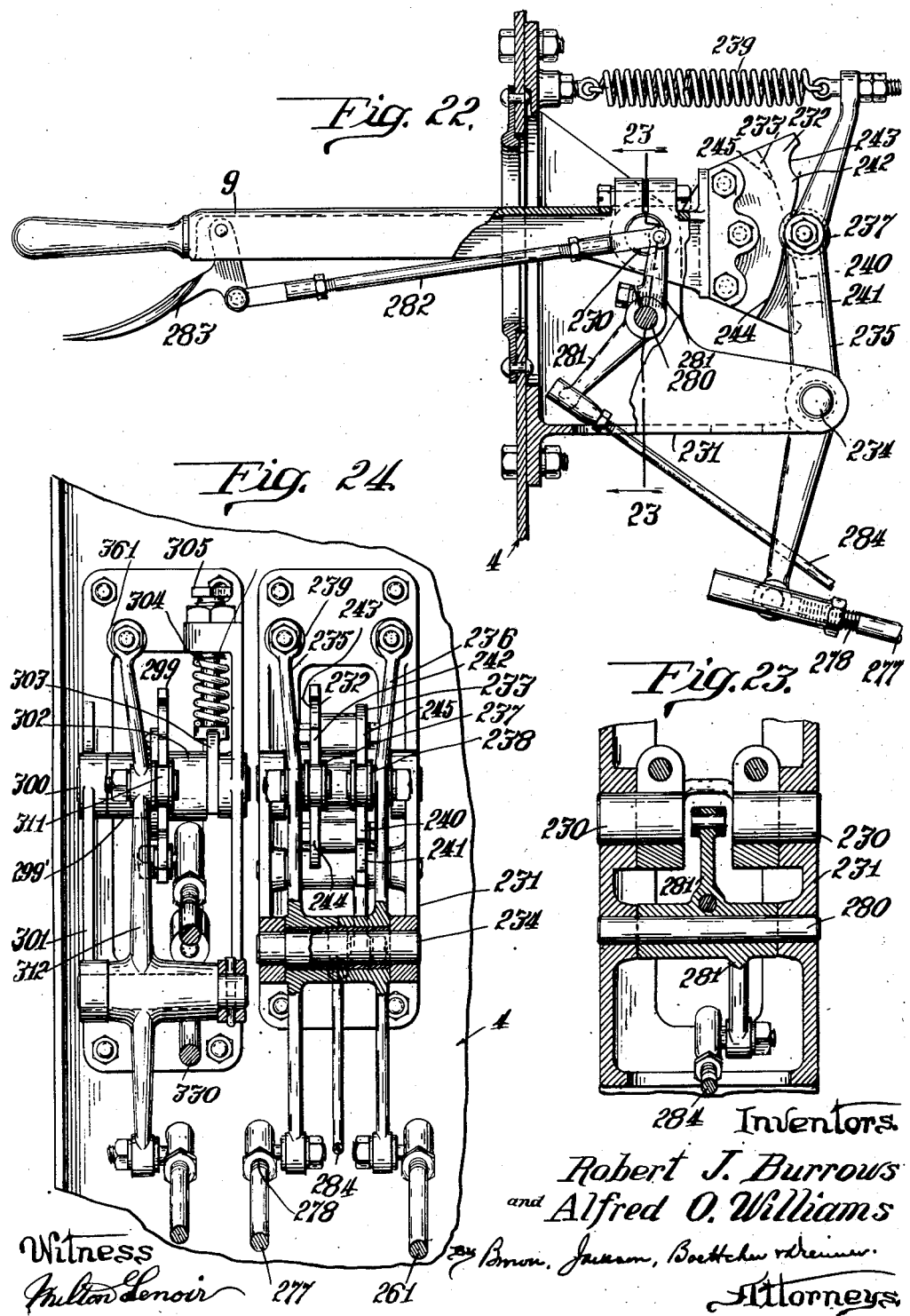

Jan. 1, 1935.  R. J. BURROWS ET AL  1,986,134
LIFT TRUCK
Filed May 25, 1931   16 Sheets-Sheet 16
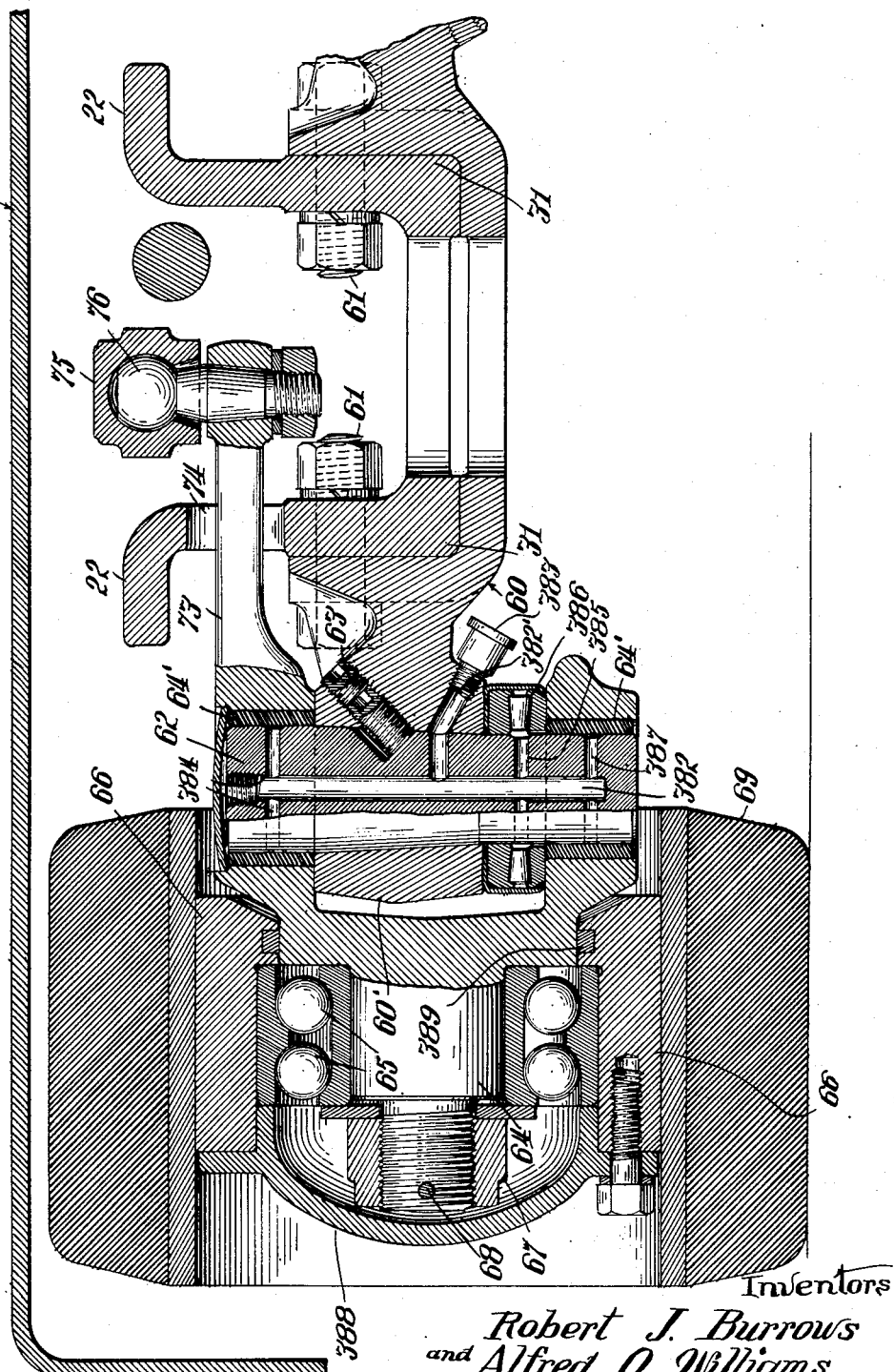
Inventors
Robert J. Burrows
and Alfred O. Williams Patented Jan. 1, 1935

1,986,134

UNITED STATES PATENT OFFICE 1,986,134

LIFT TRUCK

Robert J. Burrows and Alfred O. Williams, Battle Creek, Mich., assignors to Clark Tructractor Company, Battle Creek, Mich., a corporation of Michigan Application May 25, 1931, Serial No. 539,700

21 Claims. (Cl. 180—54)

This invention relates to self-propelled lift trucks.

Self-propelled lift trucks are now commonly used in warehouses, manufacturing plants, wharves, and the like to lift and transport heavy loads of merchandise about the premises. In the prior art of which we are aware, trucks of this type have been propelled by electric motors which derive their power from storage batteries carried upon the truck itself. An arrangement of this kind has proven very satisfactory in many respects, particularly with regard to the ease of control of the truck and its lifting platform, and the quietness of operation of the same.

Electrically driven trucks of this kind are at a serious disadvantage in certain instances, particularly when it is necessary to use the trucks continuously over a long period of time, as the batteries on the truck soon become discharged and must be recharged before the truck can render further service.

Other trucks of the prior art have employed internal combustion engines as a source of motive power, and have provided gearing arrangement such that the engine is connected to the propelling wheels of the truck and to the platform lifting mechanism to thereby operate the truck. In the Patent 1,707,428 issued to Robert J. Burrows on April 2, 1929, there is disclosed a truck of this latter type, and the present invention, broadly speaking, is an improvement upon this type of vehicle.

In the prior art internal combustion engine trucks of this type, shiftable gears have been employed to connect the motor to the driving wheels, and in certain instances operators of such vehicles have declared that the gear shift arrangement is unsatisfactory because of the noise of clashing gears when the truck is being maneuvered in close quarters.

The principal object of our present invention is the provision of a new and improved lift truck driven by an internal combustion engine which is connected to a pair of driving wheels located directly beneath it by permanently meshed gears, which are controlled by clutches, to permit maneuvering the truck in both directions. The truck is provided with arrangements for driving it from but two of its wheels and for steering it through all four of its wheels, with the result that the truck may be easily maneuvered in narrow shop aisles and the like.

Trucks built in accordance with the teachings of our invention incorporate all of the good features of each class of prior art trucks of which we are aware, and the result is highly satisfactory vehicles which may be operated continuously for days at a time if necessary to meet existing conditions. The truck is easily maneuverable both as to movement forward and backward, with respect to turning it around sharp corners, and with respect to control of its lifting platform. The truck is provided with safety devices so that in the event that the operator leaves the truck a powerful brake is applied to prevent its being moved by accidental engagement of its clutches. The improved truck of our invention is of simple but rugged construction and can be manufactured and operated economically under all conditions likely to be encountered by trucks of this class.

The truck of our invention is built upon an improved frame shown herein but disclosed in more detail and claimed in our copending application, Serial No. 610,080, filed May 9, 1932, and entitled "Lift truck", which copending application is a division of the instant application.

Our invention will be best understood by reference to the accompanying drawings in which a preferred embodiment of it is shown by way of example, and in which:

Figure 1 is a perspective view of the completely assembled truck;

Figure 2 is an elevational view partly in section and showing the motor, transmission, driving wheels and control arrangement therefor;

Figure 3 is a plan view, partly broken away, showing the details of the platform end of the truck;

Figure 4 is an elevational view of the platform end of the truck with the platform broken away to show the details of the frame structure;

Figure 5 is a plan view of the truck chassis with the motor and transmission removed;

Figure 6 is a cross-sectional view taken along the line 6—6 of Figure 5 through the driving axle of the vehicle;

Figure 7 is an elevational view partly in section taken through the motor end of the chassis and showing the connections between the motor and driving axle;

Figure 8 is a cross sectional view taken along the line 8—8 of Figure 2 showing the transmission casing and control levers therefor;

Figure 9 is a motor end elevational view of the transmission casing with the adjacent wall broken away to show the arrangement of the parts within it;

Figure 10 is a cross-sectional view of the transmission taken along the line 10—10 of Figure 9 looking in the direction of the arrows;

Figure 11 is a cross-sectional view taken substantially along the line 11—11 of Figure 10 looking in the direction of the arrows;

Figure 12 is a cross-sectional view taken along the line 12—12 of Figure 10 looking in the direction of the arrows;

Figure 13 is a cross-sectional view taken along the line 13—13 of Figure 10 looking in the direction of the arrows;

Figure 14 is a perspective view of one of the clutch elements;

Figure 15 is a perspective view, partly in section, of a clutch ring;

Figure 16 is a perspective view of a cooperating clutch ring;

Figure 17 is a detailed view of the lifting cylinder valve mechanism shown in Figures 2 and 5;

Figure 18 is a rear elevational view of the control dash of the vehicle;

Figure 19 is a fragmentary sectional view taken along the line 19—19 of Figure 18 looking in the direction of the arrows and showing the control levers of the vehicle;

Figure 20 is a sectional view taken along the line 20—20 of Figure 19 showing the details of one of the control levers;

Figure 21 is a fragmentary cross sectional view taken along the line 21—21 of Figure 20;

Figure 22 is a cross-sectional view taken along the line 22—22 of Figure 19 looking in the direction of the arrows;

Figure 23 is a cross sectional view taken along the line 23—23 of Figure 22 looking in the direction of the arrows;

Figure 24 is a fragmentary elevational view of the control dash from the motor side of it and showing the arrangement of control levers thereon; and Figure 25 is a fragmentary sectional view taken along the line 25—25 of Figure 3 and showing the details of the platform end wheel of the vehicle.

Referring now to the drawings in more detail, in Figure 1 we have shown a perspective view of a completely assembled truck embodying the principles of our invention. It will be noted that this truck is, in general, similar to the truck shown in the Burrows Patent 1,707,428. The truck consists of a load carrying platform 1 which is hung low to permit it to be placed under a load of merchandise, and is capable of being elevated through a mechanism indicated generally at 1' to lift that merchandise into the transport position.

Adjacent the load carrying platform is a motor housing 2 under which are the driving wheels 3 and in which are contained the internal combustion motor, the transmission, and other instrumentalities employed in the control of the vehicle. The back end of the motor housing is closed by a stationary dash 4 adjacent which is a platform 5 upon which the operator stands during the manipulation of the vehicle. The platform 5 contains a brake pedal 6 and an accelerator 7 through which the movement of the vehicle is controlled.

The dash 4 contains a steering wheel 8 and a pair of levers 9 and 10 which control the movement of the vehicle and the movement of the platform 1 respectively. The dash also contains an opening 11 opposite which is a radiator 12 by which the motor is cooled, the radiator being protected from injury by protective slats 13 or their equivalent. The motor crank 14 by which the motor is started projects from the dash immediately below the radiator 12. The general shape and appearance of the truck will be seen to be similar to devices of the prior art, and while the specific details may of course vary greatly within the teachings of our invention to meet specific requirements, the preferred form of truck is shown in Figure 1.

As will be seen from Figures 2, 3, 4, 5, and 7, the framework upon which the truck is built comprises a motor end section 20 which is generally U-shaped and is provided with a flanged end portion 21 adjacent the platform end of the truck, and a generally H-shaped frame 22 located beneath the platform section of the truck and attached to the motor end frame 20 in any preferred manner such as by the bolts 23 engaging the flange portion 21 of the motor end frame. The motor frame 20 extends backward and upward from the point of its connection with the platform frame 22 constituting upwardly disposed or arched frame portions serving to provide a clearance space 24, Figure 7, in which is located the driving axle of the vehicle. The frame 20 is provided with a drop portion 25 located back of this axle and with projecting arms 26 extending beneath the platform 5 of the truck. Suitable bosses 27 are provided adjacent the mounting flanges 21 of the frame 20 to afford a seating upon which the transmission casing is mounted, as will presently appear. The motor end frame is also provided with a seat 28 upon which the pump of the vehicle is mounted and with flanged seats 29 upon which the motor mounting bracket is seated. Dash supporting members are also attached to these latter seats 29.

The platform frame member 22, which as hereinbefore pointed out is generally H-shaped is provided with a plurality of bosses 30 which serve as journals for cross shafts of the platform mounting assembly, and with additional bosses 31 upon which the platform end axle of the machine is mounted.

Preferably the frame members 20 and 22 are steel castings and the seating surfaces are machined smooth to afford proper mounting surfaces for the devices to be attached to the frame. While a cast steel frame is preferred, other suitable methods of fabrication may be employed or the material may be varied within the teachings of our invention.

The driving axle, best seen in Figure 6, comprises cylindrical casing members 40 and 41 projecting from opposite ends of the differential casing 42 and terminating in forked arms 43 upon which the wheel spindles are mounted. The driving axle housing is attached to the framework by means of springs 44 which are shackled to the frame at their opposite ends 45 and 46, the housing being in turn attached to the spring in any preferred manner such as by U-bolts 47 and plates 48. When so mounted the axle is disposed in the space below the raised portion 24 of the motor frame 20.

The driving wheel spindles are generally Y-shaped and terminate in pintles 49 which are journaled by suitable bearings 50 in the arms 43 of the axle housing, thereby permitting the spindle to be rotated about a vertical axis. The spindle carries a suitable bearing 51 by which the wheel hub 52 is mounted upon it, the bearing being locked in place in any preferred manner such as by the nut 53 threaded upon the end of the spindle. The two driving wheels are mounted upon the driving axle in this manner.

As will be seen best in Figures 3 and 25, the platform wheels, which are of smaller diameter than the driving wheels, are mounted upon a short axle 60 which is bolted to the bosses 31 of the axle frame 22 by screw bolts 61 in such a manner that it is disposed transversely of the frame. The axle 60 terminates in knuckle pieces 60' through which is extended a king bolt 62 that is locked in place in the knuckle piece by a stud screw 63 which prevents it turning with respect to the knuckle piece. The wheel spindle 64 is also generally Y-shaped and is provided with bushing inserts 64' which register with the projecting ends of the king bolt 62 to rotatably mount the spindle thereon for movement about the vertical axis. The spindle 64 carries a suitable bearing 65 by which the hub 66 of the wheel is supported thereon, the bearing and wheel being held on the spindle in any preferred manner such as by the nut 67, which is preferably locked in place with a cotter pin 68.

The driving wheels and platform wheels 69 are shown equipped with solid rubber tires and while this arrangement is preferable, obviously any other type of tire may be used within the teachings of our invention.

From the foregoing it will be apparent that the four wheels of the vehicle are all mounted to be swung about vertical axes so that all four may be used in steering of the vehicle. To accomplish this steering, the wheel spindles of the platform wheels are provided with extending arms 70 formed as integral parts of the spindles and connected together by a cross rod 71 which is connected to the arm by suitable pivotal connection 72. One of the spindles is also provided with a steering arm 73 which projects through an opening 74 in the frame 22 and is connected to a steering rod 75 by a suitable pivotal connection 76. This rod extends longitudinally of the truck and frame 22 to a point near the junction of that framework with the motor and frame 20 where it is bent as shown at 76 in Figure 2 and continues rearwardly of the truck and below the driving axle and motor and frame, being connected at the rear end of the truck to a bell crank 77 located at the bottom end of the steering shaft 78. A suitable pivotal conection 79 is employed to connect the shaft 75 to the bell crank 77.

The driving wheel spindles 54 are provided with arms 80, Figure 5, which project forwardly of the axle and are connected together by a cross rod 81 which is pivoted to the arms by suitable pivotal connections 82. One of the spindles 54 is also connected to a steering rod 83 by suitable pivotal connection 84, which rod is connected in turn to a second crank arm 85 located on the steering shaft 78 by a suitable pivotal connection 86. By this arrangement it will be seen that the rotation of the steering shaft 78 in a clockwise direction will move the spindles 54 in a clockwise direction about their vertical axes, and will simultaneously move the steering rod 75 rearwardly and thereby move the platform spindles in a counter-clockwise direction about their vertical axes. A reverse movement of the steering shaft 78 will of course move the wheel spindles in an opposite direction. By this arrangement, four wheel steering of the vehicle is achieved and the truck can therefore be maneuvered in close quarters such as are encountered in shops, warehouses and the like.

As will be seen in Figures 5 and 18 the steering shaft 78 is journaled in a bracket 87 mounted on the frame member 20 and also journaled in an upper bracket 88 mounted upon the motor side of the dash 4. The shaft extends into a gear box 89 located on the motor side of the dash and in which are contained suitable gears for connecting the shaft of the steering wheel 8 to the steering shaft 78. These gears, which may conveniently be a cam and lever arrangement such as is commonly used in automotive vehicles, form no essentail part of the present invention and the specific details of their construction have therefore been omitted from the drawings and specification to avoid an unnecessary complication.

The pivotal connection by which the various rods and arms of the steering mechanism are connected together may preferably be the usual ball and spring pressed socket connection commonly used for this purpose in automotive engineering, and since these devices are well known and understood by those skilled in the art, detailed description of them is not deemed necessary herein. They are preferably each provided with a suitable lubricating device indicated generally at 72' in Figures 3 and 4 by which a supply of lubricant is forced into them to maintain them in proper working condition.

The platform 1 is attached to the framework of the truck in the manner best seen in Figures 3 and 4. Mounted upon the platform end frame 22 are a pair of transverse shafts 90 and 91 which are journaled in the bosses 30 and which project beyond the outside surface of the frame to receive bell cranks 92 and 93 respectively. These bell cranks, which may conveniently be metal castings, are attached to the projecting ends of the shafts in any preferred manner such as by bolts 94, which draw the split ends of the cranks firmly against the shaft. Keys 95 are provided to definitely lock the arm against rotation with respect to the shaft. A transversely disposed sub-platform frame member 96 is connected to the arms 92 on the shaft 90 in any preferred manner such as by the link 97 pivotally connected to the free end of the arm 92 and connected to a boss 98 on the sub-platform member 96. This member 96, which may be either a casting or a rolled steel plate upon which the bosses 98 are attached in any preferred manner such as by welding, is disposed transversely of the frame 22 and serves as a support for the platform proper, as will presently appear.

A second and generally channel shaped sub-frame 99 is connected to the arms 93 on the shaft 91 by pivotal connections between the free end of the arms and bracket 101, which are attached to the sub-frame member 100 in any preferred manner such as by the bolts 102. This sub-frame member 100 is flanged and shaped to conform to the desired shape of the end of the platform section of the truck.

The platform proper, indicated at 103, is preferably a sheet metal plate formed to the required shape from a sheet of steel of sufficient thickness to give it the strength required to withstand the loads that will be placed upon it when the truck is in service. The platform is attached to the sub-frame members 96 and 100 in any preferred manner such as by bolts or rivets 104. By this arrangement, the platform is pivotally connected to the framework of the truck such that when the shafts 90 and 91 are rotated, in a manner which will presently appear, the platform is elevated with respect to the frame by the rotation of the arms 92 and 93, the platform coming to rest in its transport position which is sufficiently high above the floor to permit transporting loads of merchandise about the premises. It will be noted that when the platform 103 is in its loading position, in which it is shown in Figure 4, its upper surface is near the floor upon which the wheels 69 are resting, and the platform may therefore be shoved under a tier or rack upon which the merchandise is loaded.

The platform elevating mechanism consists of a cylinder 110 containing a piston whose rod 111 terminates in a rack 112 which engages with a segment 113 mounted upon a cross shaft 114 which is journaled to the frame 22 in bosses 30 and is disposed parallel to the shafts 90 and 91. The segment 113 is keyed to the shaft 114 by a key 115, and is conveniently formed with a split collar which is drawn down over the shaft by means of a bolt 116.

Attached to the shaft 114 are a pair of bell crank arms 117 and 118, whose construction is similar to the arms 92 and 93 hereinbefore described, these arms 117 and 118 being keyed against rotation with respect to the shaft 114.

The shaft 90 carries a similar bell crank 119 which is connected to the bell crank 118 by a link 120 so that when the shaft 114 is rotated by an operation of the piston, shaft 190 will likewise be rotated. Similarly, shaft 91 is provided with a bell crank 121 which is connected to the bell crank 117 by a tie rod 122, so that the shaft 91 will also be rotated when the shaft 114 is rotated. When a pressure is built up in the cylinder 110 to draw the piston 111 into the cylinder, the shaft 114 is rotated in a counter-clockwise direction, Figure 4, by the engagement of the rack 112 with the segment 113. This rotates shafts 90 and 91 in a counter-clockwise direction and elevates the free ends of the bell cranks 92 and 93, which, through their pivotal connection with the sub-members of the platform structure, elevate the platform. When the pressure in the cylinder is built up in the opposite direction to force the piston 111 to the right in Figure 4, shafts 114 and 90 and 91 are rotated in a clockwise direction to lower the platform to the loading position in which it is shown in Figure 4. When the platform is in its upper or transport position, the rear end of it projects above and over the flanged end of the frame 22, and a flat shoulder 123 is provided on the framework, against which shoulder the free end of the platform member 103 may come to rest. As shown, the motor end of the platform 103 is provided with a flange 124 which prevents merchandise loaded on the platform from sliding off of it and becoming entangled with the equipment contained in the motor housing.

As will be seen in Figures 1, 2 and 7, the motor housing indicated generally at 2 in Figure 1, comprises a sheet metal box-like structure attached to supporting members of the frame and to the dash 4, the top or cover portion of this housing being hinged at 130 to permit it to be swung off of the lower portion 130 of the structure, thereby rendering the contents of the motor housing available for repair and adjustment.

Contained in this housing, is a motor 132 preferably an internal combustion motor of four cylinders, although obviously a motor having a greater or lesser number of cylinders may be used if desired. Located upon suitable supports 27 on the framework is a transversely disposed angle iron 133 to which is bolted a transmission casing indicated generally at 134 and containing the clutches, gears, lay shafts and operating forks by which the motor 132 is connected in driving relation with the driving wheels of the truck and with the pump by which the cylinder 110 is supplied with fluid pressure. The pump, 135 is mounted along side the motor upon the mounting boss 28 of the frame 20. The cylinder 110 is also mounted upon the framework 20 at the side of that framework and adjacent and below the transmission casing 134. A fuel tank 136 is mounted within the motor housing 2 and on top of the transmission casing 130, this tank being provided with a filling vent 137 which projects through the top of the housing 2 to permit the tank to be filled without removing the cover from the housing. The radiator 12, located within the motor housing and on the back side of the dash 4, is likewise provided with a filling spout 138 which projects through the top of the housing to permit water to be added to the radiator without removing the cover from the housing.

The motor housing also contains control levers, cams, and auxiliary equipment by which the truck is controlled, as will presently appear.

As will be seen in Figures 7 and 18, the motor 132 is supported at its front end by being bolted as at 140 to the transmission casing 134 which, as hereinbefore pointed out, is itself bolted to the framework 20 through the channel iron 133. The back or dash end of the motor is supported by a bracket 141 which is bolted to the bosses 29 on the upper end portion 24 of the frame member 20, this bracket 141 being generally V-shaped and being adapted to be attached to a projecting member 142 of the motor housing by bolts 143. In this manner, the motor 132 is rigidly and securely mounted in the frame of the truck within the motor housing. The motor 132 is connected in driving relation with the driving wheels 3 of the vehicle by the gears contained in the gear housing 134, as will presently appear. Included in these gears is a pinion 150 which is rigidly attached to a shaft 151 which leads through suitable bearings 152 and out of the lower part of the gear box 134. A universal joint 153, which may be of any suitable design, is rigidly attached to the shaft 151 and to a connecting shaft 154 which couples it to a second universal joint 155. This latter universal joint is mounted upon a propeller shaft 156 located in the uppermost part of the differential housing 42, being journaled therein by suitable bearings 157. The propeller shaft 156 extends completely through the differential housing 42 and a brake drum 158 is mounted on its rearward end for a purpose which will presently appear.

The differential gearing 160 is connected to the propeller shaft by a bevel gear 161 which is mounted upon a stub shaft 162, which shaft is in turn connected to the propeller shaft by gears 163. The differential shown is a typical differential such as is commonly found in automotive construction and is shown by way of example only as any desired type of differential gear may be employed within the teachings of our invention.

The driving axles 164 are splined into the differential gearing and into universal joints 165 which are located within the Y-shaped closure formed by the spindle 54 and the supporting arms 43 of the driving axle housing. A stub axle 166, formed as a part of the universal joint 165, is rotatably mounted within the spider 54 and splined to a driving plate 167 as is shown at 168. This driving plate is attached to the spider of the wheels 3 in any preferred manner such as by bolts 169 to thereby complete a driving connection to the driving wheels. As shown, the driving axles 164 and the differential gearing 160 are supported in suitable low friction bearings to minimize the power loss between the motor 132 and the driving wheels.

Because of the universal joints 153 and 155 by which the propeller shaft 156 is connected to the stub shaft 151 in the transmission housing, the driving axle of the vehicle can make a limited movement with respect to the frame of the vehicle without interrupting the driving connection of the motor. The stub shaft 154 which is splined into the adjacent members of universal joints 153 and 155 permits limited longitudinal movement of these members with respect to each other to thereby take up the play that may occur because of forward and aft movement of the driving axle with respect to the frame through its spring mounting thereon.

The transmission casing 134 forms an essential part of our present invention. This transmission includes clutches and gears whereby the driving gears are constantly in mesh with each other and are operatively connected together through the clutches to establish a driving relation from the motor 132 to the driving axle just described. As will be seen in Figures 7 to 13 inclusive the motor shaft 180 terminates in a flange 181 located in the transmission casing 134 and to which a fly wheel 182 is attached by means of bolts 183. Fitted within this fly wheel is a clutch element by which one of the driving connections to the motor is made, as will presently appear.

Bolted to the motor side of the fly wheel 182 is a ring gear 184 which meshes with companion gears 185 and 186 carried on lay shafts 187 and 188 respectively. The gear 185 is keyed to the shaft 187 by a suitable key so that that shaft 187 is rotated constantly when the motor is running. The gear 186 is not rigidly attached to the shaft 188, but rather is attached to a clutch member 189 which is rotatably supported upon the shaft 188 for a purpose which will hereinafter appear.

A third lay shaft 190 is journaled in a suitable bearing 191 located concentrically in the fly wheel 182 so that the shaft is supported concentrically with its axis in alignment with the axis of the motor shaft. A suitable anti-friction bearing 192 mounted in the opposite back wall of the housing 134 supports the opposite end of this shaft 190.

Located at the end of the shaft 190 farthest removed from the motor is a gear 193 which is keyed to the shaft 190 by a suitable key 194. This gear 193 is in constant mesh with the gear 150 located on the stub shaft 151 leading out of the transmission casing and connected to the driving axle of the vehicle in a manner hereinbefore explained.

The shaft 190 also carries a clutch element 195 which is keyed to it by a suitable key 196. This clutch element fits within a companion clutch element 197 bolted to the fly wheel 182 by bolts 198. The clutch element 195 has radially projecting teeth 198 located on its outer periphery, with which teeth the inwardly projecting teeth 199 of the metallic clutch rings 200, Figure 2, are meshed. The clutch element 197 carried by the fly wheel 182 has inwardly projecting teeth 201 with which the outwardly projecting teeth 202 of the fibrous clutch rings 203, Figure 15, are meshed.

Surrounding the shaft 190 are springs 204 which bear against forks 205 to press the metallic clutch plates 200 against the fibrous clutch plates 203 to establish a driving connection from the fly wheel 182 to the stub shaft 190.

The specific details of the clutch used in commercial embodiments of our invention may be varied within the teachings of the invention, the clutches shown are of the type disclosed more fully in the copending application of Alfred O. Williams, Serial No. 503,686, filed December 20, 1930, this particular type of clutch being shown by way of example only.

The lay shaft 187 is journaled in the rear wall of the casing 134 by suitable bearings 210 and carries a clutch member 211 keyed to it by a suitable key 212. This clutch element 211 is of the same type as the element 195 and cooperates with a companion clutch element 213 which is mounted upon a member 214 and supported upon the shaft 187 by bearings 215. Rigidly attached to this member 214 is a gear 216 which constantly meshes with the gear 150 on the propeller shaft, as will be seen in Figure 9. The member 214 is journaled in the casing 134 by bearing 217, which bearing also serves to support the adjacent end of the shaft 187 in the casing.

Springs 218 surround the shaft 187 and through spiders 219 control the clutch rings 220 of this clutch to establish a driving connection from the motor to the propeller shaft of the vehicle.

The clutches thus described and the gears connected to them together form the forward and reverse driving connection between the motor 132 and the propeller shaft of the vehicle. For example, when the clutch comprising elements 195 and 197 are engaged, power from the motor shaft 180 is transmitted through the fly wheel 182 and the clutch element 197 connected thereto through the clutch discs 200 and 203 to the clutch element 195 that is keyed to the lay shaft 190. Power is transmitted through that shaft and the gear wheel 193 that is keyed thereto to the gear 150 and thence through the shaft 151 and the universal joint to the propeller shaft 156, to rotate that shaft and thereby drive the vehicle in one direction. Preferably the forward movement of the vehicle is achieved through the power train just enumerated.

When the clutch comprising elements 195 and 197 are disengaged and the clutch comprising elements 211 and 213 are engaged, power from the motor shaft 180 is transmitted through gears 184 and 185 and the key 188 to the lay shaft 187, from which it travels through the clutch element 211 and the rings cooperating therewith to the clutch element 213, thence through the member 214 to the gear 216 which is meshed with the gear 150, so that that power is transmitted to the propeller shaft to drive it in a reverse direction and consequently move the vehicle in an opposite direction.

Obviously when one of the clutches above described is engaged in driving relation, the two elements of the opposite clutch are moving in opposite directions because of the constantly meshed gears attached to them, however since the clutch discs 200 and 203 are not under spring pressure this movement of the two elements of the clutch in opposite directions is not objectionable.

As shown the gears employed in the transmission are all spur gears, this type being shown by way of example only. In instances where quietness of operation is a factor, as for example in a truck to be used on passenger wharves and the like, these plain gears may be replaced by any preferred type of quiet running gears, such as for example herringbone gears. Since all of the gears in the transmission are constantly meshed, any of the quiet running gear systems may be conveniently used in lieu of the plain spur gears shown.

The control of the clutches through which forward and reverse movement of the vehicle is accomplished is achieved through movement of lever 9, Figure 1, which lever is raised to cause a movement of the vehicle in a forward direction and lowered to move it in a reverse direction.

As will be seen in Figures 22, 23 and 24 the lever 9 is pivoted to rotate about the axis of a shaft 230 which is supported upon a suitable bracket 231 located upon the motor side of the dash 4. Two cams 232 and 233 are attached to the lever 9 upon the far side of its pivot 230, as best shown in Figure 19.

The bracket 231 also contains a projecting arm in which is journaled a short cross shaft 234 upon which are mounted two camming levers 235 and 236, these levers carrying cam rollers 237 and 238 which engage with cams 232 and 233 respectively. Springs 239 attached to the mounting plate of the bracket 231 and to the upper end of the levers 235 and 236 tension those levers to keep their respective rollers tightly engaged against the surface of the cams. Cam 233 is located so that its hill 240 is located on its lowermost end and leads into a socket 241 into which the roller 238 fits when the lever 9 is moved into its extreme lowermost position, thereby elevating the cam 233 to bring the roller 238 on the lever 236 into engagement with the socket 241. Cam 232 is located in the reverse relation, that is its hill 242 is located on its uppermost edge and terminates in a socket 243 into which the cam roller 237 is moved when the lever 9 is raised to its uppermost position.

The lower one-half of the cam 232 is formed as a portion of a cylinder 244 whose center coincides with the center of the shaft 230 upon which the lever is pivoted, so that when the lever 9 is moved downwardly the lever 235 is not rotated about its pivotal axis 234. Similarly, the upper one-half of the cam 233 is cylindrical as shown at 245 and therefore equidistant from the center of shaft 230 so that when the lever 9 is rotated in an outward direction about the shaft 230 camming lever 236 is not rotated about its pivotal axis 234. By this arrangement it will be seen that when the lever 9 is rotated downwardly camming lever 236 is rotated about its axis in a clockwise direction, Figure 22, and when lever 9 is rotated in the opposite direction, that is upwardly, camming lever 235 is similarly rotated in a clockwise direction about its axis. By this arrangement control of the forward and reverse movement of the vehicle is accomplished as follows.

Referring now to Figure 10 it will be seen that the clutch comprising elements 211 and 213 are controlled by a collar 250 which bears against the spring spider 219 through the medium of a low friction bearing 251. The collar 250 is provided with pintles 252 which engage a fork 253, as seen in Figure 9. This fork is carried by a stub shaft 254 journaled in the walls of casing 134 and containing a crank 255 located on the outside surface of that casing. A secondary control shaft 256 is journaled in suitable bearings 257 which are attached to the casing 134 and which hold the shaft 256 in a transverse position across the top of the gear casing. Located on one end of this shaft 256 is a crank 258 which is connected by a suitable link 259 to the crank 255 on the fork arm. A similar crank 260 is attached to the opposite end of the shaft 256 and is connected by means of a tie rod 261 to the camming lever 236, so that each time the control lever 9 is moved to its lowermost position and camming lever 236 thereby rotated about its axis, the fork 253 is moved to bring the clutch rings 200 and 203 of the reverse clutch into operative relation with each other so that a driving connection is established between the lay shaft 187 and the gear 216. Power is therefore transmitted to the driving axle to drive the vehicle in a reverse direction in the manner hereinbefore pointed out.

The clutch comprising elements 195 and 197 by which the motor is connected to the propeller shaft to drive the vehicle in a forward direction likewise carry a collar 270 which engages the spider plate 205 through a low friction bearing 271. The collar 270 is provided with pintles 272 upon which the fork 273 is engaged. This fork 273 is carried on a cross shaft 274 journaled into suitable bearings 275 located in the upper part of the transmission casing 134. This shaft 274 projects outwardly from one side of the transmission casing and is provided with a bell crank 276. The free end of this bell crank 276 is connected by tie rod 277 to the camming lever 253 so that each time the control lever 9 is moved to its uppermost position and camming lever 235 rotated about its axis, the clutch elements 195 and 197 are clutched together to establish a driving connection from the motor shaft 180 to the lay shaft 190 which, as hereinbefore pointed out, is connected by permanently meshed gears to the propeller shaft of the vehicle, and the vehicle is therefore driven in a forward direction. The connecting rods 261 and 277 are each provided with suitable pivotal connections connecting them at their opposite ends to the respective cranks, and are threaded as shown at 278 so that they may be adjusted for length with respect to the pivotal connections, thereby maintaining the proper relative movements of the bell cranks and camming lever.

The tie rods and links are adjusted so that when the control lever 9 is in its neutral position, in which it is shown in Figure 22, and both of the camming levers 235 and 236 are engaging the cylindrical portions of their respective cams, the forward and the reverse clutch mechanisms are both positioned so that their respective discs 200 and 203 can slip with respect to each other and the motor 132 is therefore disconnected from the propeller shaft of the vehicle. A movement of lever 9 in either direction will operate one or the other of the clutch mechanisms to establish a driving connection from the motor to the propeller shaft of the vehicle.

As will be seen in Figure 23 the shaft 230 upon which the lever 9 and cams 232 and 233 are pivoted is in reality two shafts spaced apart on the median line of the bracket 231. This bracket also supports a shaft 280 upon which is pivoted a bell crank 281 which is connected by rod 282 to the finger lever 283 on the lever 9, and which is connected by lever 284 to the throttle of the motor 132 as will presently appear. By this arrangement as the operator moves the lever 9 to clutch the motor to the propeller shaft of the vehicle for movement in either direction he may, if desired, accelerate the motor by manipulation of the hand lever 283. The linkage arrangement by which this is accomplished will be more fully brought out hereinafter.

Contained in the transmission casing 134 is another clutch element to one member 189 of which the gear 186 is permanently attached, that element and the gear being rotatably supported upon shaft 188 by bearings 290. The companion member 291 of this clutch element is keyed to the shaft 188 by a suitable key 292. The rings 200 and 203 of this clutch, constructed in the hereinbefore explained manner, connect this latter clutch element 291 to the motor through gear 186 and gear 184, so that when this latter clutch is engaged the lay shaft 188 is driven by the motor. This latter shaft is employed to drive a hydraulic pump 135, Figure 2, which generates pressure to control the raising and lowering of the platform 1 of the truck. The pump is controlled through the clutch elements 189 and 291 by a collar 293 to the pintles 294 of which is connected a yoke 295, which yoke is pivotally supported upon a shaft 296 as will be seen in Figure 9. This shaft is journaled into the casing 134 of the transmission housing and projects therebeyond to receive the crank 297 which is rigidly attached to it. Connected to the free end of the crank is a tie rod 298 which leads up to a cam 299 which is mounted back of the dash 4 in operative relation to the control lever 10, Figure 1.

As will be best seen in Figures 20, 21 and 24, the lever 10 is pivoted to a cross shaft 300 that is supported upon a rearwardly projecting bracket 301 adjacent the opening in the dash 4 through which the lever 10 projects. The bushing 302 by which the lever 10 is mounted upon the shaft 300 is retained by a spring pressed friction element 303 maintained tightly against the bushing 302 and the shaft 300 by the spring 304, the tension of which is adjusted through the adjusting nut 305. This spring is tensioned so that the lever 10 will remain in the position to which it is left when the operator removes his hand from it.

The cam 299 is carried on a similar bushing 299' which is rotatably supported upon the shaft 300, the cam being connected to the lever 10 by means of a spring pressed pawl 306 which is controlled by the hand lever 307 that is pivoted at 308 to the control lever 10.

The working face of the cam is provided with a centrally located valley 310 in which the roller 311 of the cam lever 312 rests when the handle 10 and the cam 299 are in their middle or neutral position. At this time the fork 295 is positioned so that its control is in neutral, and the motor is disconnected from the pump. Rising out of this valley 310 on the cam 299 are hills 313 and 314 which lead into sockets 315 and 316 respectively into which the roller 311 of the camming lever is positioned when the cam is moved to its extreme positions.

The camming lever pivoted at 315 to a shaft that is mounted upon the bracket 301 is held against the cam 399 by a spring 316, so that when the cam is moved out of its neutral position in either direction the camming lever is rotated in a clockwise direction about its pivot and is locked in its operated position by the engagement of the cam roller 311 with the pockets 315 or 316. The hand lever 307 is rotated about its pivot to withdraw the pawl 306 from its engagement with the cam 299 at the completion of the cam setting operation, and the lever 10 may then be restored to normal independently of the cam. When released the cam is retained in its position by the roller 311, and when the lever 10 is released it is retained in the position in which it is set by the crank friction device 303 as hereinbefore pointed out.

The lever 10 is lifted to effect the lowering of the platform 1 of the truck to its loading position, in which it is shown in Figure 1, and the lever 10 is lowered, that is moved in a counter-clockwise direction about its pivot, Figure 20, to control the platform lifting mechanism to cause it to lift the platform 1 to its transport position. This platform lifting mechanism consists of the pump 135 which is connected to the lay shaft 188 in the transmission housing by a flexible coupling 320. The pump, which may conveniently be a gear type pump, is maintained under normal hydraulic pressure by a standpipe 321 which is filled with oil and which leads to the intake side of the pump. The pump is connected by piping 322 to the valve chamber 323 located on the top of the cylinder 10. As will be seen in Figure 17, this valve chamber 323 houses a cylindrical valve 324 which is movable longitudinally of the cylinder 110. When the valve 324 is in its neutral position, in which it is shown in Figure 17, the ports 325 and 326, leading from it to the opposite ends of the cylinder 110, are both blocked and whatever pressure there is in them is thereby retained.

The valve 324 is connected by lost motion connection 327 to a bell crank 328 which is pivotally supported upon the gear casing 134 and connected to the cam 299 by a tie rod 329. An eyelet 330 is included in this tie rod to permit it to be properly aligned with the cam, and at the same time to permit the shaft 315 upon which the camming lever 312 is positioned to be properly located with respect to the cam 299. Obviously, if desired, the tie rod 329 may be shaped so that it can connect directly to the cam 299 and the eyelet 330 may be omitted.

By this arrangement it will be seen that when the lever 10 is raised, that is moved in a clockwise direction about its pivotal axis, in addition to engaging the clutch to connect the motor 132 to the pump 135, the movement of the cam 299 moves the tie rod 329 and consequently rotates bell crank 328 in a counter-clockwise direction about its pivot. This moves the valve 324 to the right, as seen in Figure 4, and connects the port 326 through the port 331 in the valve to the inlet side of the pump 135, and simultaneously connects the port 325 in the cylinder 110 through the port 332 in the valve 324 to the pressure side of the pump. With the valve so positioned pressure built up in the pump forces the piston outward of the cylinder 110 and the platform of the truck is lowered by the bell crank and rack and pinion arrangement hereinbefore described. Liquid confined in the cylinder 110 ahead of the moving piston escapes through the ports 326 and 321 to the suction side of the pump 135 and thence through that pump returning to the opposite side of the piston through ports 322 and 325.

As will be seen in Figures 2 and 4, the piston rod 111 by which the piston is connected to the rack 112 carries a link 335 which is connected to a bell crank 336 that is pivoted at 337 to a suitable boss located on the end of the cylinder 110. The free end of this bell crank 336 is connected by a tie rod 338 to the bell crank 328. When the piston rod 111 reaches its outermost position, the link 335 is engaged by a pin 339 which slides in the slot 340 in the link 335, moving that link and causing it to move the bell crank 336 in a counter-clockwise direction about its pivot 337. This movement of the bell crank 336 rotates the bell crank 328 about its pivot in a clockwise direction, and through the movement of this bell crank and lever 329 the cam 299 is rotated sufficiently to bring the roller 311 of the cam lever 312 out of engagement with the notch 315 and into engagement with the inclined portion 313 of the cam. This unlatching of the lever causes the tension of spring 361 to restore the camming lever 312 to its normal position, and by the action of roller 311 on the inclined surface 13 of the cam the cam is also restored to normal.

Because of the lost motion connection 327 between the lower end of the bell crank 328 and the valve element 324, sufficient movement of the bell crank 328 to unlatch the cam 299 may be accomplished before the valve 324 is moved. When the cam is snapped back to its normal position by the spring 361, valve 324 is moved to the left, Figure 17, against the tension of its spring 341 into the position in which it is shown in Figure 17, and the pressure then built up in the cylinder 110 is retained therein and the piston brought to rest.

When the lever 10 is moved in an opposite direction, that is counter-clockwise about its pivot, roller 311 on the camming lever 312 is brought into registration with the notch 316 to again engage the pump clutch to the motor. The cam is thus rotated in a counter-clockwise direction about its pivot and rod 329 is caused to move the bell crank 328 in a clockwise direction about its pivot. This moves the valve element 324 to the left, Figure 17, thereby connecting the port 325 through the valve port 322 to the suction side of the pump 135 and simultaneously connecting the port 326 through the port 343 to the pressure side of the pump so that pressure built up in the pump will be delivered to the opposite face of the piston and draw it into the cylinder 110. This operates the pinion and bell crank arrangement by which the platform is mounted on the frame, in an opposite direction, and thereby lifts the platform to its transport position. This movement of the piston rod 111 inwardly of the piston 110 brings the pin 339 to the opposite end of the slot 340 in the link 335, thereby moving that link and the bell crank 336 in an opposite direction. This movement of the bell crank 336 through the medium of connecting rod 338 moves the bell crank 328 in a counter-clockwise direction thereby unlatching the cam 299 and permitting the spring 361 to snap it back to its normal position. As before, the lost motion connection 327 permits unlatching of the cam prior to movement of the valve member 324 and full and complete operation of the piston is thereby insured.

When the cam 299 is snapped back to its neutral position through the action of the spring 361 acting on the roller 311, its movement is rapid and to prevent injury to the operator by a rapid movement of the lever 10, we have provided the retractable pawl 306 which when retracted releases the lever from the cam, thereby permitting the cam to snap back to its neutral position independently of the lever. Because of this arrangement the danger of the operator of the vehicle being injured by this snapping back of the cam 299 is entirely removed.

As will be noted in Figures 9 and 10 the transmission casing 134 is oil-tight and is filled with a sufficient quantity of oil to cause the gears and clutches to work in oil. To permit access to the gears and clutches for adjustment and repair, the transmission casing is provided with removable covers 350 and 351 which are located on its opposite sides and when removed expose the outer sets of clutches and gears. The top plate 352 is likewise removable and through it the middle clutch and its gears are accessible. The housing 134 is also provided with hand hole covers 354 bolted or otherwise suitably attached over the bearing members and removable to render those bearings accessible for maintenance operations. Suitable grease retainers 355 are provided at points where the shafts extend through the casing to render it oil-tight.

As previously mentioned the propeller shaft 156 projects completely through the differential casing and is provided with a brake drum 158 on which are located braking members 360 and 361 pivoted to a stationary member 362 located at the top of the differential housing, as will be seen in Figures 7 and 18. The bottom ends of these brake members 360 and 361 are disposed upon opposite sides of an operating cam 363 which is pivoted to rotate about a pin 364 projecting out of the differential housing at its lower edge. A compression spring 365 maintains these brake shoes 360 and 361 tightly against the cam and when the cam is in its normal position the brake shoes 361 and 362 are positioned so that the braking element 366 engages the brake drum 159 to stop the vehicle.

The cam 363 is provided with a bell crank lever 367 which is connected by a suitable tie rod 368 to the bell crank lever 369 on the foot brake pedal lever 370, which lever terminates in the foot brake pedal 6 available from the operating platform 5 of the vehicle. When the pedal 6 is depressed cam 363 is rotated to spread the brake shoes 360 and 361 away from the brake drum 158 against the tension of spring 365 and the vehicle may then be moved under its own power. When the pedal 6 is released and restored to its normal position, in which it is shown in Figure 18, the brake is set and the vehicle is stopped thereby. By this arrangement it is impossible for the vehicle to be moved accidentally when the operator is not on the operating platform, since the brake is more powerful than the driving clutches and when it is set these clutches are incapable of transmitting sufficient power to the propeller shaft 156 to move the vehicle. The clutches will slip under these conditions but since they are running in oil no particular damage will result.

The operating platform 5 is also provided with a foot feed or accelerator 7 which is pivoted at 371 beneath the platform and connected by link 371' to the bell crank 372 which through rod 373 is connected to a feed shaft 374 that is pivoted in brackets 375 located upon the back side of the dash. From this shaft, suitable pivotal connections including the tie rod 376 lead to the carburetor valve of the vehicle so that the motor 132 may be accelerated. The hand throttle 283 which is attached to the locomotion clutch control lever 9, as previously explained in connection with the description of Figure 22, is connected by its tie rod 284 to this carburetor feed shaft 374 so that the motor may be accelerated by the hand lever as well as by the foot feed accelerator pedal 7.

The carburetor has been omitted from the drawings as unnecessary since any preferred type of carburetor may be used within the teachings of our invention. In Figure 2 we have shown an air cleaner 377 provided to strain dust particles out of the air supplied to the carburetor, the use of such equipment obviously being purely discretionary.

Lubrication of the vehicle is provided by running the gears in the transmission casing in oil as previously explained. The internal combustion motor is provided with the customary crank case containing oil which provides for its lubrication. The differential housing is oil tight and is filled with suitable lubricant so that the differential gears and pinions by which the propeller shaft 156 is connected to the differential, and the bearings of the propeller shaft, are all run in oil. The hub plates 167 on the driving wheels cooperate with the hubs of those wheels to form an oil tight joint which may be filled with a suitable lubricant to lubricate the main bearings 51 of those wheels. The bearings 50 by which the spindle pintles are supported in the driving axle housing are closed by suitable caps 380 which with the grease ring 381 form grease tight pockets in which the bearings 50 are located, and those bearings can thus be packed in suitable lubricant. As will be seen in Figure 25, the king pin 62 of the platform wheels is drilled to provide a grease duct 382 which communicates within the duct 382' in the spindle 61, and a suitable grease cup 383 is provided to force the lubricant into the duct 382. Cross ducts 384 deliver this lubricant to the upper king pin bearing 64', and a similar cross duct 385 delivers lubricant to the main thrust bearing 386. A third cross duct 387 delivers lubricant to the lower spindle bearing 64'.

The cover plate 388 of each of the platform wheels cooperates with the hub of the wheel and with the packing member 389 to form a grease tight pocket in which is located the bearings 65 by which the wheel is supported upon the spindle. The pivotal connections in the steering equipment and other pivotal connection used about the truck may be lubricated by the usual arrangement employed in connections of this kind. The steering gear box 89 is also preferably oil-tight and the steering gears are run in oil.

From the foregoing it will be apparent that we have devised a new and useful vehicle which is controlled in a manner quite unlike the vehicles of the prior art. While we have illustrated our invention by showing a preferred embodiment of it, we have done so by way of example, as we are aware that it may be changed in many respects by one skilled in the art without departing from the teachings of the invention.

Having thus complied with the statutes and shown and described a preferred embodiment of our invention what we consider new and desire to have protected by Letters Patent is pointed out in the appended claims.

What is claimed is:

1. In a truck of the class described, a wheeled frame, an operator's platform at the rear of the frame, an internal combustion motor mounted over the wheels at the rear of the truck, driving means for connecting said motor to said rear wheels and including a longitudinally disposed propeller shaft, optionally controlled gear means connecting one end of said shaft with the forward end of said motor, said shaft extending rearwardly beyond the axis of said rear wheels, operative connections between the rear end of said shaft and said rear wheels for driving the latter, a dash on said truck at the forward end of the platform and rearwardly of the motor, and means on said dash for selectively controlling said gear means to thereby control the movement of said truck.

2. In a truck of the class described, a wheeled frame, an internal combustion motor mounted over the rear wheels of said frame, axle shaft means connected with said rear wheels, driving means for connecting said motor with said axle shaft means and including a longitudinally extending propeller shaft connected at its forward end with said motor to be driven therefrom, a casing enclosing said driving means and serving to support the forward end of said motor on said frame, said propeller shaft being journaled at its forward end in said casing and disposed fore and aft of said axle shaft means and spaced vertically therefrom, gear reduction means at the rear end of said propeller shaft opposite said casing, said gear reduction means being disposed adjacent the rear end of the motor and adapted to drive said axle shaft means from said propeller shaft, and means supporting the rear end of the motor at a level appreciably above the level of the forward section of the wheeled frame.

3. In a vehicle of the class described, a frame, four wheels supporting said frame, said wheels being pivoted to rotate about vertical axes on the frame, an internal combustion motor mounted over one pair of said wheels, driving axles for said pair of wheels, means connecting said motor with said axles, said means including a forward speed clutch and a separate reverse speed clutch mounted on parallel axes, a dash on said vehicle adjacent said motor, a pair of levers mounted on said dash, means controlled by said levers for operating said clutches to control the movements of said vehicle, manually operable means for controlling said levers, a steering mechanism mounted on said dash, and means connecting said steering mechanism to said wheels for moving them about their vertical pivots to steer the vehicle.

4. A truck comprising a frame mounted on four steering wheels, an internal combustion motor mounted over two of said wheels, a load carrying platform mounted over the other two of said wheels, driving means including two separate clutches for connecting said motor in driving relation with said motor end wheels, one of said clutches being disposed coaxial with respect to the crank shaft of the motor and the other clutch being arranged with its axis substantially parallel with respect to the axis of said first clutch, clutch control means operable to selectively connect said motor to said wheels, a steering mechanism connected with said steering wheels, a platform raising mechanism mounted on said frame and operable to raise and lower it, a third clutch operable to connect said mechanism with said motor and disposed with its axis parallel to the axis of said first clutch and on the opposite side of the motor from said second clutch, and a control lever operable to control said latter clutch and said platform raising mechanism.

5. In combination, a wheeled frame, an internal combustion motor mounted over the rear wheels of said frame, a driving axle connecting said pair of wheels, said axle including a differential gear and a housing therefor, a transmission mechanism connected with the forward end of said motor, and means connecting said transmission through said differential gear with said driving axle, said means including a propeller shaft journaled in said differential housing and extending rearwardly of said differential gear for connecting the rear end of said propeller shaft with said differential gear.

6. In combination, a wheeled frame, an internal combustion motor mounted over a pair of the wheels of said frame, a driving axle connecting said pair of wheels, said axle including a differential gear, a transmission mechanism connected to said motor, and a propeller shaft connecting said transmission through said differential to said driving axle, said propeller shaft being located beneath said motor and between it and said differential gear, a brake drum on said propeller shaft and brake shoes pivoted to the casing of said driving axle and engageable with said drum.

7. A vehicle comprising a frame having upwardly arched sections at the rear end thereof, a pair of driving wheels connected with said frame through a driving axle disposed underneath said arched sections of the frame, a motor mounted over said driving axle, a transmission connected to said motor, a casing therefor mounted on said frame forward of said arched sections, a propeller shaft extending rearwardly from the transmission casing and disposed between the upper portions of said arched frame sections below the motor, said propeller shaft serving to connect the motor and the driving axle and extending fore and aft of and above the latter, and means connecting said propeller shaft with the driving axle to thereby establish a driving connection between said motor and axle by which the motor moves the vehicle, said last named means including a stub shaft arranged between said arched frame sections and below said propeller shaft rearwardly of the driving axle and gear means connecting the stub shaft with said propeller shaft, said gear means being also disposed rearwardly of the driving axle.

8. In a truck of the class described, a framework supported by wheels and including upwardly arched frame sections at the rear end of the framework, a motor mounted on said frame over said upwardly arched sections and including a crank shaft, a lay shaft in axial alignment therewith, clutch means connecting said lay shaft with the crank shaft of the motor, a transmission casing secured to said motor for supporting the same and secured to said framework forwardly of said upwardly arched sections, a propeller shaft journaled in said casing and extending rearwardly therefrom underneath said motor and the crank shaft and lay shaft, gear means connecting the forward end of said propeller shaft with said lay shaft, an axle housing for certain of said wheels and disposed underneath said upwardly arched frame sections and including differential gearing between said last named wheels, said propeller shaft extending through said axle housing and rearwardly of said differential gearing, and gears rotatable in a transverse plane spaced rearwardly of the axis of said last named wheels for connecting said propeller shaft to said differential gearing.

9. In a truck of the class described, a pair of driving wheels, a motor mounted over said wheels, driving means connecting said motor to said wheels and including permanently meshed forward and reverse gear trains disposed in coplanar relationship at the forward end of the motor, a propeller shaft disposed under the motor and connected at its forward end to one of said gear trains, and separate clutches for selectively connecting said trains to the motor, and a single control lever at the rear end of said motor for controlling said clutches, said lever being movable in one plane to three distinct positions, corresponding to neutral, forward and reverse connections between the motor and said wheels.

10. In a truck of the class described, a pair of driving wheels, a motor, driving means connecting said motor to said wheels, said means including permanently meshed forward and reverse gear trains, and clutches for selectively connecting said trains to the motor, and a control means for said clutches comprising, a fork for each clutch, a cam roller connected to the fork, and a pair of simultaneously moved complementary cams for moving said rollers to thereby engage the clutches.

11. In a truck of the class described, an internal combustion motor, a pair of driving wheels, a drive shaft geared to said wheels, a pair of lay shafts, permanently meshed gears connecting said lay shafts to said drive shaft, a pair of clutch elements permanently geared to said motor, one of said elements being rotatably mounted on each of said lay shafts, a clutch member keyed to each of said lay shafts, and a control lever for selectively engaging said clutch members with their respective clutch elements to thereby connect said motor to said wheels to cause it to drive them in a forward and a reverse direction.

12. In a truck of the class described, a pair of driving wheels, a motor mounted over said driving wheels, and a driving means connecting said motor to said wheels, said means including a casing secured to one end of the motor and having upper, lateral and lower portions, permanently meshed gear means disposed, respectively, in said portions, the gear means in said lower portion being adapted to be selectively driven by the gear means in said upper and lateral portions, separate clutches associated with the gear means in said upper and lateral portions and selectively operable to connect those gears with the motor, and a propeller shaft disposed below said motor and operatively connected with the gear means in the lower portion of said casing and with said driving wheels for driving the latter.

13. In a truck of the class described, a pair of driving wheels, a motor mounted directly over said wheels and a driving means connecting said motor to said wheels, said means including a longitudinally disposed forward speed shaft and a longitudinally disposed reverse shaft, permanently meshed gears connecting said shafts to said wheels, a clutch for each of said shafts for selectively connecting it to said motor, a lever for each of said clutches pivotally mounted for swinging movement about a common axis, and means including a control lever and separate cams carried thereby, one for each of said clutch levers, said control lever being operable to one position to actively engage one of said clutches and to another position to actively engage the other clutch.

14. The combination of a motor having a shaft, a pair of lay shafts, a clutch element rotatably mounted on each lay shaft, gears permanently connecting said clutch elements to said motor shaft, a propeller shaft, gears permanently connecting said propeller shaft to said lay shafts, a clutch member keyed to each lay shaft, means cooperating with said clutch elements to engage them with their respective clutch members, and means, including a single control lever for operating said cooperating means to selectively engage said clutches.

15. A lift truck comprising a frame, four wheels supporting said frame, a unidirectional motor mounted on said frame near the rear end thereof and over two of said four wheels, means including parts adjacent the forward end of the motor for establishing a driving connection between said motor and said two wheels, said means including permanently meshed gears rotatable in a common plane transversely of the truck and clutches for controlling the gears, and means adjacent the rear of the truck and including a single operating lever for controlling said clutches to selectively establish said driving connection for moving the truck in a forward or in a reverse direction.

16. A truck comprising a frame mounted on wheels, an operator's platform at one end of the frame, a lifting platform at the other end of the frame, two of said wheels being driving wheels disposed adjacent the operator's platform at said one end of the frame, a motor mounted on said frame adjacent the operator's platform, a longitudinally disposed propeller shaft journaled for rotation under said motor and connected to be driven therefrom by gears disposed adjacent the end of the motor opposite the operator's platform, said propeller shaft extending past the axis of said driving wheels to a point adjacent the operator's platform, means including a longitudinally disposed stub shaft extending forwardly from the operator's platform for operatively connecting the propeller shaft with the driving wheels, brake means including parts carried on the rear portion of said propeller shaft, and means operable on the adjacent operator's platform for controlling said brake means.

17. A truck comprising a frame mounted on wheels, an operator's platform at one end of the frame, a lifting platform at the other end of the frame, two of said wheels being driving wheels disposed adjacent the operator's platform at said one end of the frame, differential mechanism connecting said driving wheels, a longitudinally disposed propeller shaft journaled for rotation under said motor and connected to be driven therefrom by gears disposed adjacent one end of the motor, said propeller shaft extending past said differential to a point adjacent the operator's platform, means including a longitudinally disposed stub shaft extending toward the operator's platform for operatively connecting the propeller shaft with the differential mechanism, brake means including parts carried on the rear portion of said propeller shaft, and means operable on the adjacent operator's platform for controlling said brake means.

18. A truck comprising a frame mounted on wheels and having upwardly arched side portions adjacent one end, two of said wheels constituting drive wheels and having differential mechanism and driving axles associated therewith, housing means for said axles and mechanism disposed under said arched frame portions, spring means connecting said housing with said frame portions, a motor mounted at one end on said portions of the frame above said housing, gear means connected with the motor to be driven thereby, a casing for said gear means disposed at the other end of the motor and connected with the frame adjacent said arched portions to support said other end of the motor thereon, and a longitudinally disposed propeller shaft driven by said gear means and extending under said motor, said shaft extending toward and connected with said differential mechanism for driving said axles.

19. A truck comprising a frame mounted on wheels, two of which are driving wheels, and having downwardly disposed end portions with upwardly arched sections near one end of the frame, said downwardly disposed end portions thereby being of unequal length, a lifting platform disposed on the longer end portion, a motor mounted at one end on said upwardly arched sections, a gear casing connected with the other end of said motor and carried by the frame between the longer end portion and the upwardly arched sections for supporting the other end of the motor, gear means driven by said motor disposed within said casing, an operator's platform disposed on the shorter end portion of said frame, differential means including a housing connecting said two driving wheels, a propeller shaft driven from the gear means in said casing and journaled in said differential housing adjacent said operator's platform, brake means associated with said propeller adjacent said operator's platform, and driving connections between said propeller shaft and said differential means.

20. A truck comprising a frame mounted on wheels, two of which are driving wheels, and having upwardly arched portions adjacent one end of the frame, an internal combustion engine mounted at one end on said upwardly arched frame portions, a gear casing connected with the other end of the motor and disposed on the frame adjacent said upwardly arched portions, thereby serving to support the other end of the motor, said casing comprising a generally laterally disposed housing having a central section connected with the motor and two laterally disposed sections arranged below said central section and connected, respectively, with the sides of said frame, a propeller shaft operatively connected with said driving wheels at its rearward end and extending at its forward end into said casing below said central section thereof, gear means in said casing connecting the propeller shaft with the motor, including clutch mechanism disposed in the central section of the casing, reverse mechanism disposed in one of said lateral casing sections and also operatively connected with said propeller shaft, a lifting platform carried by said frame, fluid pressure responsive mechanism for raising and lowering said platform, a fluid pump disposed alongside said motor, and means connecting said pump with said motor, including gear means disposed in the other laterally disposed casing section.

21. In a truck of the class described, a pair of driving wheels, a motor, driving means connecting said motor with said wheels, said means including permanently meshed forward and reverse gear trains, separate clutches for selectively connecting said trains with the motor, and a transmission casing secured to said motor and enclosing said gear trains and separate clutches, an operator's platform adjacent the rear end of the truck, and control means for said clutches comprising shift means carried by said casing for each clutch and correlated cam means mounted adjacent the operator's platform and operatively connected with said shift means for moving the same to control said clutches.

ROBERT J. BURROWS.
ALFRED O. WILLIAMS.